United States Patent
Pozzer

(10) Patent No.: US 12,304,682 B2
(45) Date of Patent: May 20, 2025

(54) HORIZONTAL PACKAGING MACHINE WITH ADJUSTABLE CUT-SEW GROUP

(71) Applicant: TECNO PACK S.P.A., Schio (IT)

(72) Inventor: Corrado Pozzer, Schio (IT)

(73) Assignee: TECNO PACK S.P.A., Schio (IT)

( * ) Notice: Subject to any disclaimer, the term of this patent is extended or adjusted under 35 U.S.C. 154(b) by 204 days.

(21) Appl. No.: 18/040,432

(22) PCT Filed: Jun. 25, 2021

(86) PCT No.: PCT/IB2021/055640
§ 371 (c)(1),
(2) Date: Feb. 3, 2023

(87) PCT Pub. No.: WO2022/029519
PCT Pub. Date: Feb. 10, 2022

(65) Prior Publication Data
US 2024/0025590 A1  Jan. 25, 2024

(30) Foreign Application Priority Data

Aug. 6, 2020 (IT) .................. 102020000019414

(51) Int. Cl.
*B65B 61/08* (2006.01)
*B65B 51/14* (2006.01)
(Continued)

(52) U.S. Cl.
CPC ............. *B65B 61/08* (2013.01); *B65B 51/14* (2013.01); *B65B 51/306* (2013.01); *B65B 59/001* (2019.05); *B65B 2210/04* (2013.01)

(58) Field of Classification Search
CPC ... B29C 65/18; B29C 65/305; B29C 65/7451; B29C 66/1122; B29C 66/4312;
(Continued)

(56) References Cited

U.S. PATENT DOCUMENTS 3,943,686 A * 3/1976 Crawford .............. B29C 66/849
  53/550
4,106,265 A * 8/1978 Aterianus ................. B65B 9/06
  53/550

(Continued)

FOREIGN PATENT DOCUMENTS

GB   1164761 A    9/1969
GB   2590432 A *  6/2021  ............. B29C 65/02
(Continued)

OTHER PUBLICATIONS

International Search Report and Written Opinion in corresponding International Patent Application No. PCT/IB2021/055640 mailed Oct. 1, 2021. 13 pages.
(Continued)

Primary Examiner — Thomas M Wittenschlaeger
Assistant Examiner — Himchan Song
(74) Attorney, Agent, or Firm — Leason Ellis LLP

(57) ABSTRACT

A horizontal packaging machine for packaging a product fed in a horizontal direction comprising a control panel and a cut-sew group to make on a packaging film transverse welds and a cut to close and separate from each other two successive packs. The cut-sew group comprises a plurality of cut and sew tools to make said transverse welds and the cut. The transverse welds define the edges of the packs according to different packaging sizes for said product. The horizontal packaging machine can change the size of the aforesaid packs simply by selecting through the control panel one of the cut and sew tools of the plurality present in the cut-sew group, and by positioning said cut-sew group so that the product to be packaged is fed at said cut and sew tool selected to make the packs according to a prefixed and set size through the control panel. The cut-sew group comprises an upper shaft and a lower shaft independently controlled in rotation by means of a respective upper motor and a respec-
(Continued)

tive lower motor. Each shaft mounts on it said plurality of cut and sew tools and wherein each cut and sew tool consists of an upper tool and a corresponding lower tool. Each cut and sew tool comprises one or more heat-sealing spatulas to make said transverse welds for closing the packs and one or more cutting elements to make said cut which mutually separates two successive packs.

24 Claims, 18 Drawing Sheets

(51) Int. Cl.
  *B65B 51/30* (2006.01)
  *B65B 59/00* (2006.01)
(58) Field of Classification Search
  CPC .......... B29C 66/73921; B29C 66/8167; B29C 66/8169; B29C 66/83513; B29C 66/8412; B29C 66/849; B29C 66/91; B29C 66/91214; B29C 66/91231; B29C 66/91421; B29C 66/91431; B29L 2031/7128; B65B 2210/02; B65B 2210/04; B65B 51/14; B65B 51/306; B65B 59/001; B65B 61/08; B65B 9/06
  See application file for complete search history.

(56) References Cited

U.S. PATENT DOCUMENTS

| | | | | |
|---|---|---|---|---|
| 4,254,601 A | * | 3/1981 | Prager | B29C 66/83513 83/337 |
| 5,548,946 A | * | 8/1996 | Holub | B29C 66/1122 53/550 |
| 10,773,839 B1 | * | 9/2020 | Talda | B65B 61/28 |
| 2003/0230387 A1 | * | 12/2003 | Smith | B29C 66/80 156/581 |
| 2004/0045469 A1 | * | 3/2004 | Herhold | B29C 66/437 101/490 |
| 2004/0250510 A1 | * | 12/2004 | Dalietos | B65B 25/148 53/399 |
| 2005/0147800 A1 | * | 7/2005 | Herhold | B29C 66/437 428/116 |
| 2010/0199602 A1 | * | 8/2010 | Montano | B29C 66/876 53/374.2 |
| 2015/0052856 A1 | * | 2/2015 | Sbabo | F16M 9/00 248/669 |
| 2018/0127132 A1 | * | 5/2018 | Cybart | B65B 61/188 |
| 2021/0101704 A1 | * | 4/2021 | Gundelach | B29C 65/745 |
| 2023/0278743 A1 | * | 9/2023 | Sablone | B65B 51/02 |
| 2024/0025590 A1 | * | 1/2024 | Pozzer | B29C 66/91 |

FOREIGN PATENT DOCUMENTS

| | | |
|---|---|---|
| JP | 2017113270 A | 6/2017 |
| WO | WO-2021058113 A1 * | 4/2021 |

OTHER PUBLICATIONS

International Preliminary Report on Patentability in corresponding International Patent Application No. PCT/IB2021/055640 mailed Jul. 18, 2022. 16 pages.

* cited by examiner

HORIZONTAL PACKAGING MACHINE WITH ADJUSTABLE CUT-SEW GROUP

CROSS-REFERENCE TO RELATED PATENT APPLICATIONS

This application is a U.S. National Stage Application under 35 U.S.C. § 371 of International Patent Application No. PCT/IB2021/055640 filed Jun. 25, 2021, which claims the benefit of priority of Italian Patent Application No. 102020000019414 filed Aug. 6, 2020, both of which are incorporated by reference in their entireties. The International Application was published on Feb. 10, 2022, as International Publication No. WO 2022/029519 A1.

FIELD OF THE INVENTION

The present invention relates generally to a horizontal packaging machine.

More in detail, the present invention relates to a horizontal packaging machine with a cut-sew group (also known as a "crimper"), adjustable in position along a direction orthogonal to the advancement direction of the product to be packaged arranged on a conveyor belt.

In particular, the horizontal packaging machine according to the invention can produce packs of various sizes, in particular of different lengths, without changing the machine set-up.

PRIOR ART

Flowpack packaging is a type of packaging for food products. Flowpack packaging means a type of plastic packaging made with the aid of a horizontal packaging machine.

In a flowpack horizontal packaging machine, the individual products are transferred and advanced directly within a single packaging film, which is welded in three points: two transverse welds which define the two lateral (or front and back) edges of the pack and a longitudinal weld to achieve the closing of the pack.

Therefore, the flowpack packaging is made starting from a film that once folded to form a tube is filled with the product (or products) and passes through a cut-sew group which allows the making of the two transverse welds indicated above (the one at the beginning and the one at the end of the pack).

In particular, the longitudinal welding is formed in the lower portion of the pack by means of a series of pairs of heat-sealing wheels positioned upstream of the cut-sew group, the number of which varies according to construction choices.

The final product (i.e. the flowpack) is then obtained by means of two transverse welds, which close the tube pack at the two edges with the product inside and separate the pack made from the next pack being formed.

The packaging film is arranged to form a tunnel to surround and envelope the product to be packaged. The film is formed by a single continuous web wound on a feeding reel and on which the different packs, all of the same size, are made. In particular, the reel is made from a continuous packaging film in which the different packs are printed in an aligned sequence on one side. Normally, the inner side of the packaging film, i.e. the side in contact with the product, is made of a suitable food-grade material.

Each pack will be the same size and display the same information (e.g. product name, manufacturer's logo, list of ingredients, product images, etc.), and the machine is calibrated to divide the packs so that the cuts are made in a predetermined portion in which there is no writing or images, but there could be a possible pattern or a monochromatic portion dedicated to welding and cutting. Therefore, the pack is repeated on the plastic film equal to itself with neutral interludes in which the welds and the cuts are made.

The flowpack packaging machine comprises a welding unit, which has a continuous welder (typically located on the lower side in horizontal machines), which welds the two longitudinal ends of the packaging film, and a transverse heat-sealing head (or double head), which simultaneously welds the tail of one pack and the head of the next pack.

In particular, the cut-sew group makes a first weld, which closes the final edge of the pack, i.e. the tail, then makes the cut to separate the pack just made from the next pack being formed, and finally makes the second weld, which makes the initial edge or head of the second pack. In this manner, the individual wrappers are divided into separate packs.

Flowpack (horizontal) packs examples are the packs frequently used for cakes, snacks, portioned breadsticks packs, packs of crackers, individually wrapped sandwiches, candy, multiple packs of biscuits, chocolate bars, chocolates, etc.

At present, the horizontal packaging machines are designed to process a limited series of lengths, for instance a group of sizes in a given range of lengths which can be obtained with the same cut-sew group by setting the speed to achieve the desired pack length.

Furthermore, at present, if products with a different size must be packed, i.e. a length of the pack not comprised in the range obtainable with the cut-sew group mounted on the machine, the cut-sew group must be replaced on the machine itself, which operation provides disassembling the entire cut-sew group and refitting one with a different configuration of heat-sealing spatulas.

Alternatively, again in the prior art, the change of size (i.e. of length range) of the pack can be obtained by either increasing or decreasing the number of spatulas mounted on the cut-sew group present in the machine. However, this solution requires an adjustment and the intervention of a specialized mechanic. Furthermore, to implement such a solution, it is necessary to wait for the spatulas to cool down before disassembling them, and then it is necessary to wait for the still-mounted spatulas to warm up again before using them. Therefore, this operation requires very long machine stops.

According to the different types of products to be packaged, the cut-sew group, for example, the unit which performs the transversal welds and the cut which separates the packs and which is located downstream of the longitudinal welding group, has a different configuration, for example a different arrangement of the heat-sealing spatulas on the shaft. As mentioned above, this operation can be carried out by physically changing the cut-sew group or by changing the number and position of the heat-sealing spatulas on the same cut-sew group to modify the range of pack lengths which can be made.

Currently, the tool replacement operation implies deadtime in which the machine is idle and non-operational. Furthermore, the size change operation (for instance, we repeat, the range of lengths which can be produced) requires the intervention of specialized manpower because it implies the replacement of a heavy element, for instance weighing about 200-300 kg, or alternatively the variation (decrease or increase) of the number of spatulas on the same group, and in both cases also requires the making of different connections and calibrations before being able to use the machine again.

These disadvantages (downtime and the need for specialized interventions) make it necessary to find a solution which allows the horizontal packaging machines to be more flexible and easy to modify.

Therefore, the need is felt for a single machine which can be easily adapted to the different sizes required for packaging products.

SUMMARY OF THE INVENTION

Horizontal packaging machines have a feeding system for the products to be packaged. Typically, such a feeding group comprises a conveyor belt on which the products to be packaged are fed in an orderly manner and with a suitable spacing.

In particular, the solution suggested here refers to a particular portion of the horizontal packaging machine, i.e. the cut-sew group (the group which performs the transversal welds of the edges of the packs).

The technical problem that the present invention sets out to overcome is the possibility of making packs of different sizes using a single machine and exploiting an "immediate" and "automatic" tool change that can be done by anyone without requiring the intervention of specialized personnel.

The solution suggested here envisages a tool change which does not require a long machine stop for the physical replacement of a cut-sew group or a change in the number of spatulas on the group itself but allows the machine to be adapted to the different length sizes of the package to be obtained without any need to disassemble and physically replace the cut-sew group or some spatulas.

Therefore, the present patent application provides a horizontal packaging machine and a cut-sew group including embodiments which solve the aforesaid and other limitations.

It is a purpose of the present invention to disclose a horizontal packaging machine for packaging a product fed in a horizontal direction comprising a control panel and a cut-sew group to make on a packaging film transverse welds and a cut to close two successive packs separating from each other. The cut-sew group comprises a plurality of cut and sew tools to make the transverse welds and the cut. The transverse welds define the edges of the packs according to different packaging sizes for said product. The horizontal packaging machine can change the size of the aforesaid packs simply by selecting through the control panel one of the cut and sew tools of the plurality present in the cut-sew group, and by positioning said cut-sew group so that the product to be packaged is fed at said cut and sew tool selected to make the packs according to a prefixed and set size through the control panel.

The cut and sew group comprises an upper shaft and a lower shaft independently controlled in rotation by means of a respective upper motor and a respective lower motor. Each shaft mounts on it said plurality of cut and sew tools and wherein each cut and sew tool consists of an upper tool and a corresponding lower tool.

Each cut and sew tool comprises one or more heat-sealing spatulas to make said transverse welds for closing the packs and one or more cutting elements to make said cut which mutually separates two successive packs.

Furthermore, each spatula of a cut and sew tool is mounted cantilevered on the respective upper or lower shaft, and comprises two welding elements connected to each other by a central portion, wherein said central portion is connected to one of said shafts and is made integral with the upper shaft or with the lower shaft.

The welding elements of each spatula are parallel welding bars, facing each other and spaced apart, connected to each other by the central portion, and the two welding elements are shaped so as to form an opening between them within which opening the cutting element is positioned.

The spatulas are connected to their respective upper or lower shafts by bolted flanges or brackets.

In addition to the spatulas and cutting elements, each cut and sew tool also mounts spacer elements to hold the spatulas in place.

Preferably, the cutting element of the upper tool is a serrated blade which allows making zigzag-shaped cuts, wherein the blade is received between the parallel, welding bars, facing and spaced apart, and the cutting element of the corresponding lower tool is a straight counterblade mounted on cup springs to cushion the blow of the blade during cutting.

Preferably but not necessarily, the cutting elements are made of hard steel and could also consist of straight blades.

In an embodiment of the invention, the plurality of tools of the cut-sew group comprises three tools mounted spaced apart on respective upper and lower shafts. The first tool mounts three spatulas spaced 120 degrees apart, the second tool mounts a single spatula, and the third tool mounts six spatulas spaced 60 degrees apart.

The pitch between two successive cut and sew tools is 100 mm and the maximum displacement stroke of the cut-sew group for positioning the selected tool is 200 mm.

The cut-sew group is mounted on a carriage or slide which allows a displacement of the cut-sew group relative to a direction transversal to the horizontal feeding direction of the product to select the tool to be used for packaging the product according to the selected size and position of the cut-sew group, so that the product to be packaged is fed at the selected cut and sew tool.

The carriage comprises a structure having a support base mounted on two guide rails, two uprights, and an upper closure portion. The two guide rails extend transversally relative to the product feeding direction, the support base mounts recirculating ball bearings and the structure is moved by means of a handling gear driven by a horizontal movement motor.

Between the two uprights of said carriage an upper shaft and a lower shaft are mounted independently and controlled in rotation by means of a respective upper motor and a respective lower motor also mounted on one of the uprights, wherein the plurality of cut and sew tools is mounted on each shaft and wherein each cut and sew tool consists of an upper tool and a corresponding lower tool.

On the other upright on the opposite side relative to that one on which the upper and lower motors are mounted, respectively an upper electric collector and a lower electric collector for carrying to the upper shaft and the lower rotating shaft an electric signal for the diversified heating of one of the cut and sew tools are mounted.

A further purpose of the invention is also the cut-sew group alone, which comprises a plurality of cut and sew tools for performing transverse welds and the cut, wherein the cut-sew group can perform a size change by selecting one of the cut and sew tools of the plurality so that the product to be packaged is fed at the selected cut and sew tool for making packs according to a predetermined size.

BRIEF DESCRIPTION OF THE FIGURES

Further features and advantages of the invention will be apparent from the reading of the following description provided by way of non-limiting example, with the aid of the figures shown on the accompanying tables, wherein.

Figure 1:
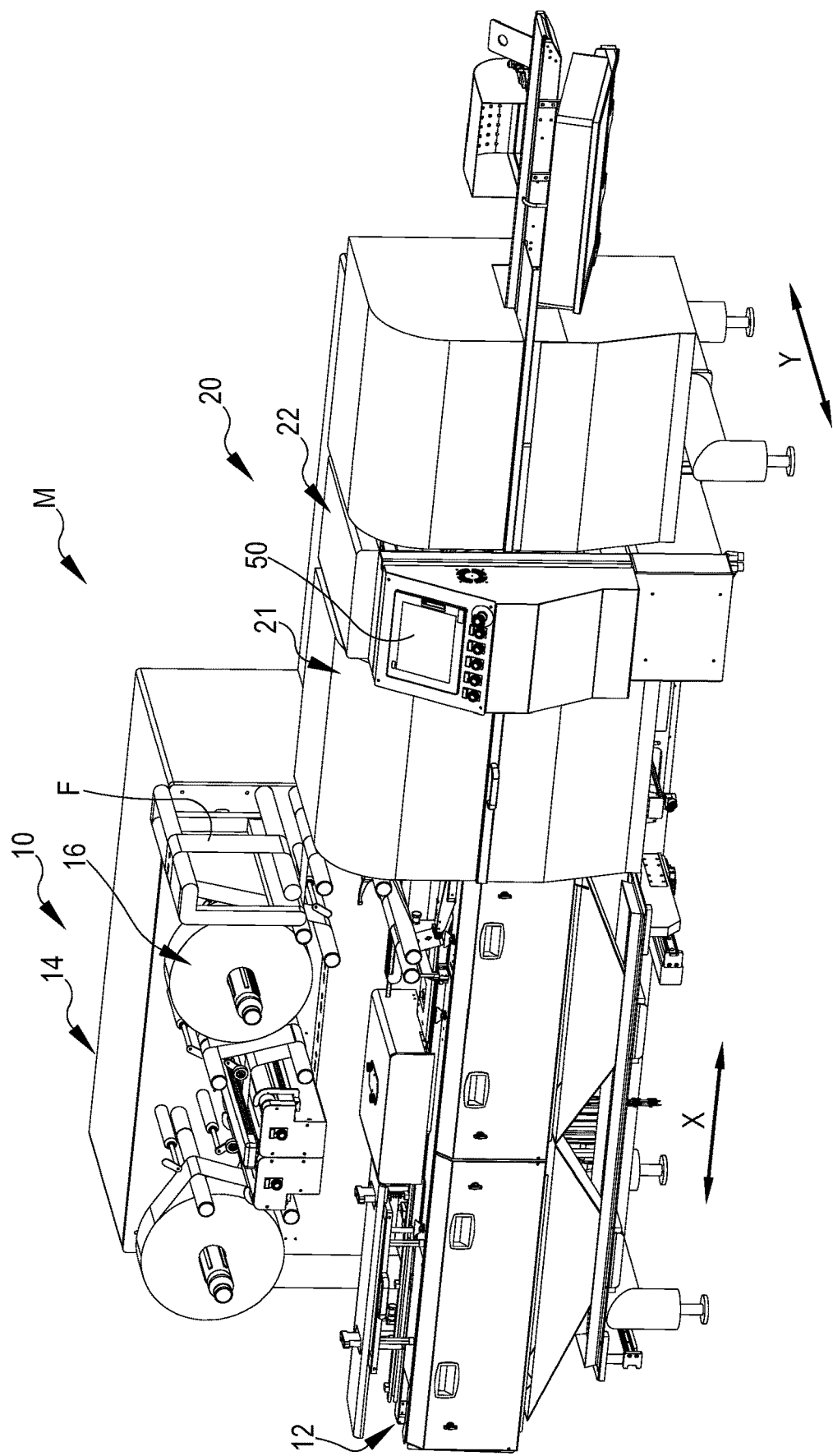
FIG. 1 shows a perspective diagrammatic view of a horizontal machine according to the present invention.

The parts according to the present description are shown in the drawings, where appropriate, with conventional symbols, showing only those specific details which are relevant to understanding the embodiments of the present invention, so as not to highlight details which will be immediately apparent, to those skilled in the art, with reference to the description given herein.

DETAILED DESCRIPTION OF THE INVENTION

The machine according to the present invention mounts a particular cut-sew group comprising a plurality of "cut and sew" tools designed for different lengths of packs or packets.

In particular, the cut-sew group comprises two overlapping and facing rotating shafts which each carry the same plurality of cut and sew tools, opposing and corresponding to each other.

A cut and sew tool consists of one or more electrified heat-sealing spatulas arranged radially on the corresponding rotating shaft.

Transverse welding takes place by localized heating of the packaging film using a pair of electrified heat-sealing spatulas (an upper spatula and a lower spatula mounted on their respective tools) which periodically meet during shaft rotation and heat and weld the edges of the pack.

Finally, the cut-sew group further comprises cutting elements which are operated to separate two successive packs at the end of the first welding of the tail (or trailing edge) of the finished pack and before the beginning of the second welding of the head of the package being formed.

This cut is carried out by means of the aforementioned cutting elements, e.g. consisting of a blade and a counterblade arranged inside the electrified heat-sealing spatula. In particular, in various embodiments, the blade will be mounted between two facing and spaced welding elements of the spatula on the upper shaft, and the counterblade will be mounted between two facing and spaced welding elements of the spatula on the lower shaft.

With the machine according to the invention, each cut and sew tool can be used to make a plurality of packaging sizes, and in this case, the operating speeds, i.e., the rotation speed of the two shafts, should also be varied in addition to the configuration and setup of the machine. Furthermore, the plurality of cut and sew tools in a single cut-sew group gives the machine a high degree of flexibility and adaptability.

In this manner, the machine becomes flexible and can be used to package different products or different sizes of the same product without interventions requiring the assembly or disassembly of the entire cut-sew group or the assembly or disassembly of the spatulas on or from the same cut-sew group.

The need to have a very flexible machine arises from the fact that some manufacturers need to make different packs for a single product to be put on the market, for instance single, double or multiple packs, and they want to do this with a single machine. Therefore, the machine must have a configurable cut-sew group on board which can adapt to different sizes so that a large number of length ranges can be achieved.

Currently, as mentioned, the size (i.e. the workable length range) is changed by materially changing the entire cut-sew group (thus mounting a different cut-sew group on the machine) or the desired number of spatulas present on the same unit, requiring a machine stop which halts production and requires the intervention of specialized personnel.

In contrast, the cut-sew group according to the present invention comprises various conformations which provide a plurality of cut and sew tools carried by two overlapping, facing rotating shafts. Each cut and sew tool comprises one or more electrified heat-sealing spatulas arranged radially on each rotating shaft of the cut-sew group.

The different cut and sew tools, composed of one or more spatulas, are mounted on a single cut-sew group and this makes it possible to achieve the various sizes (i.e. range of lengths) by selecting each time the cut and sew tool to be used inside the same cut-sew group mounted on the machine. Of course, the cut-sew group can comprise any number of tools (at least two) to achieve a variety of different sizes.

In the examples illustrated in the Figures, which show the preferred embodiment, the cut-sew group comprises three different cut and sew tools arranged spaced apart on respective shafts of the cut-sew group. In particular, on the upper shaft there are three upper tools and on the lower shaft there are the three lower tools aligned to cooperate with their corresponding upper tools.

In the machine of the invention suggested herein, the tool is changed by modifying the position of the cut-sew group, i.e. by making the entire cut-sew group translate transversely relative to the feeding direction of the product to be packaged and centering the desired cut and sew tool, e.g. the central tool, relative to the feeding position of the packaging film and the product to be packaged.

Therefore, the cut-sew group is a mechanical element which moves, by virtue of a carriage or a slide, with a motorized command to arrange the desired upper and lower tools at the packaging film and the belt which feeds the products to be packaged.

In the embodiments considered and illustrated in the drawings, the cut-sew group comprises, as mentioned, three cut and sew tools (three upper and three lower), and this configuration makes it possible to maintain approximately the same overall dimensions of the machine without impacting too heavily on the space occupied by the machine in a plant.

At the current state of the art, there are no horizontal packaging machines of this type on the market.

The entire horizontal packaging machine of the invention will now be described in a preferred embodiment of the invention, but not a limiting one.

The horizontal packaging machine comprises a conveyor belt which transports the products P to be packaged spaced out from each other according to a predetermined pitch and feeds them to the packaging machine in a forming unit where it meets a reel of packaging film coming from a film unwinding group. The product passes through the forming tunnel in which the film spread and unwound from the reel is folded to form a tube which envelopes the product and is longitudinally welded by a group of pairs of heat-sealing wheels.

Downstream of the forming unit is the cut-sew group, in which the pack is welded and cut at its two ends in the transverse direction relative to the longitudinal weld made earlier. The cut-sew group welds the bottom (or tail or rear edge) of the first pack, then cuts and finally welds the head of the next pack.

The transverse welding tool (upper and lower) comprises one or more transverse welding spatulas, which are electrified and heat-activated spatulas.

Cutting elements, such as blades to cut and divide one package from the next are present within each spatula, between the two facing welding elements.

Each upper and lower cut and sew tool is made, as a function of the set of pack lengths to be obtained, by one or more spatulas positioned to cut the packs to the correct and desired size.

For example, with the packaging machine of the invention shown in the accompanying drawings, the product feed rate is 1,250 products per minute to obtain a single package, i.e., wrap a single product P.

The cut and sew tool for single packs is made of a plurality of spatulas spaced with a pitch to support these high numbers, otherwise the tool with a single spatula would have to turn at an excessively high speed and reach excessively high accelerations.

At the moment, the cut-sew group in the current machines on the market creates a single size consisting of a set of lengths, and to change the size it is necessary, as mentioned above, to change the entire group formed by two shafts or it is necessary to vary the number of spatulas by adding or removing some of them. These operations disadvantageously involve costs, machine stops, and the presence of a specialized mechanic who makes the change by disassembling the entire cut-sew group or by varying the number of spatulas.

Furthermore, at present, the size change cannot be carried out by a simple food industry operator, e.g. the operator who changes the reel of the packaging film or who checks the packs, because the right professional is required for this type of intervention.

Indeed, the specialized mechanic must disassemble the heavy cut-sew group, e.g. weighting up to one quintal, disconnect the various connections of the unit with the machine, mount a new group, and reconnect the various cables and connections. Alternatively, the specialized mechanic must act directly on the cut-sew group by assembling or disassembling spatulas.

With the solution described here, the cut-sew group comprising a plurality of upper and lower tools is simply made to slide transversely relative to the advancement direction of the product by virtue of a carriage or slide to change the tool used to obtain a different size of the final package.

In the embodiments illustrated in the figures, when the two shafts of the cut-sew group rotate and one of the three tools is working, the other two tools also rotate integrally with the shafts but the spatulas of the other two tools are arranged offset relative to the spatulas of the tool in use so that when a spatula of the upper tool in use touches a spatula of the lower tool in use, the upper and lower spatulas of the other two tools are in such a position as not to touch each other, i.e., they are offset so as not to be in contact.

In the assembly of the different tools, there are offsets between the spatulas that make up the tools, i.e., if in the first tool the spatulas are positioned in the origin the first spatula of the second tool will have an offset relative to the origin and the first spatula of the third tool will have a further offset relative to the spatulas of the other two tools.

The two shafts that make up the cut-sew group have independent motors to achieve the initial alignment of the upper and lower tools. In particular, the alignment is done with a Homing technique, i.e., fine-tuning the positions of the tools on the two shafts. When the operator communicates to the machine through the operator panel the intention to work with one of the tools, the upper and lower tools must be aligned. This is done with the two independent servo-assisted motors which are mechanically synchronized.

Therefore, the solution according to the invention makes it possible to achieve an easy tool change to obtain a change which allows for a large number of length ranges. The cut-sew group is assembled once and then an adjustment is made with the two separate motors to align the tools to be used with each other and positioning of the cut-sew group to the feed line of the products to be packaged.

The machine comprises several motors for various adjustments. In particular, there are two separate motors, one for each shaft on which the welding tools are mounted so that the shafts can turn independently during initial calibration. Normally, in regular operation, the two motors run synchronously. Furthermore, the machine of the invention comprises a motor for positioning the cut-sew group and, finally, a motor for vertically moving the upper shaft.

Therefore, the spatulas of the selected welding tools are heated to perform the welding.

The welding tools are connected by means of connecting cables to an electrical collector group. In particular, there are two separate collectors, one for each shaft, and each tool in the cut-sew group is independently connected to its respective collector.

This allows each tool to be controlled separately so that only the tool in use is heated, leaving other tools unheated. In this manner, the collectors supply electricity to the spatulas through cables running through the trees. The spatulas are heated by means of heating elements powered by electricity.

Furthermore, this separate connection makes it possible to set a different temperature for each tool group. Furthermore, this separate connection makes it possible to have a different temperature for the same group of tools in case a different packaging film with different thermal characteristics or with a different thickness is used.

An electrical collector is a system which carries an electrical signal on a rotating shaft. The electrical collector inside has rotating brushes and fixed brushes which generate a rotating sliding contact for transmitting the electrical signal.

The rotating collector is an electromechanical device which allows the transmission of power and electrical signals continuously from a static part to a rotating part or vice versa by maintaining constant temperatures on the spatulas by transmitting a signal from a thermocouple (or a resistance thermometer) to a temperature controller.

This solution, capable of continuous rotation, can significantly simplify the steps of mounting and assembly, avoiding the use of articulated systems with complex wiring with the possibility of damage and machine stop, drastically reducing maintenance interventions.

According to the transmission technology, the rotating collectors can manage power, data, or both in one combined solution.

The collector used in the solution suggested here can differentiate the temperatures of the various welding tools, allowing different temperatures to be selected for each tool of the plurality. Of course, while a tool is being used, i.e. the spatulas of the tool are heated, other unused tools remain cold. This also serves to minimize power consumption.

The collector used is made so that it is all differentiable, so that only the spatulas of the tool in use are independently heated.

The support structure of the packaging machine requires the shafts carrying the cut-sew group to be supported by a frame and there are bearings to facilitate the rotation of the shafts.

We now turn to a detailed description of an embodiment using the figures.

With reference to FIG. 1, a horizontal packaging machine is indicated by reference M as a whole.

The horizontal packaging machine M comprises a feeding portion 10 and a welding portion 20, which in turn comprises a cut-sew group 22. The feeding portion comprises a conveyor belt 12 for conveying the product to be packaged P in an orderly and cadenced manner, and a film unwinding group 14. In the film unwinding group 14, a reel 16 of packaging film F is unwound to go into the tunnel to pack the product P fed on the conveyor belt 12. Preferably, the conveyor belt 12 provides seats 12a obtained on the conveyor belt by virtue of transversal walls 12b created on the belt 12 and which allow the right spacing between the different products P. The packaging film F is wound on the reel 16 and through a series of return rollers 17 is unwound and kept in tension to feed the second portion of the machine, i.e., the welding portion 20.

The welding portion 20 makes the final package and performs three welds, one longitudinal relative to the advancement direction of the product to be packaged P, and two transverse welds to separate the packs from each other. The transverse welds are the two welds that make the closing edges of each pack.

The solution described here focuses on transversal welding and employs a special cut-sew group 22 (also known as a "crimper"), which makes it possible to make packs of different sizes as will be better described below. The cut-sew group 22 can have different configurations according to the format and size of the product to be packaged P.

Figure 2:
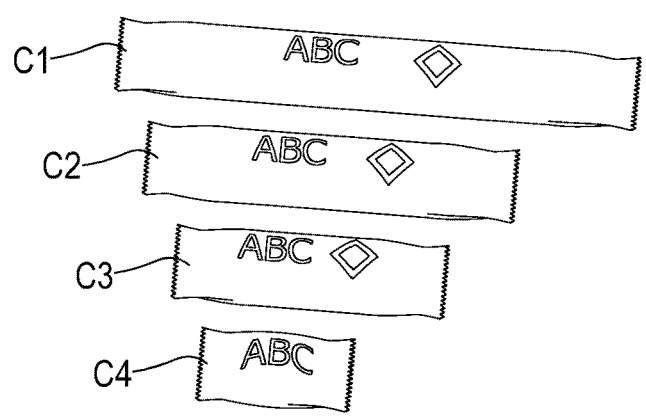
FIG. 2 shows different packaging sizes for the same product, all of which can be made using the horizontal packaging machine in FIG. 1.
Figure 3:
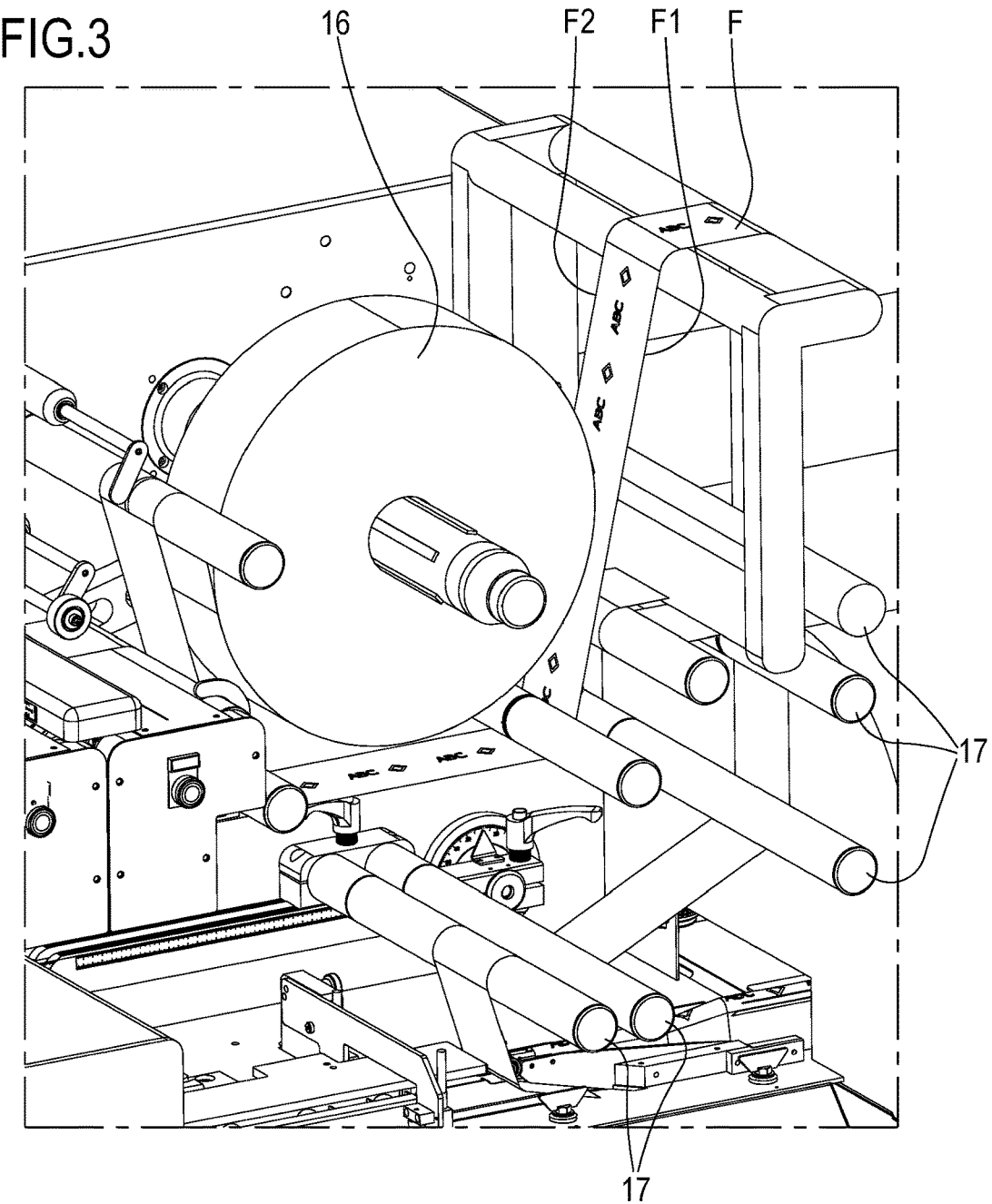
FIGS. 3 to 8 show some enlarged views of details of the product feed portion of the horizontal packaging machine in FIG. 1.
Figure 4:
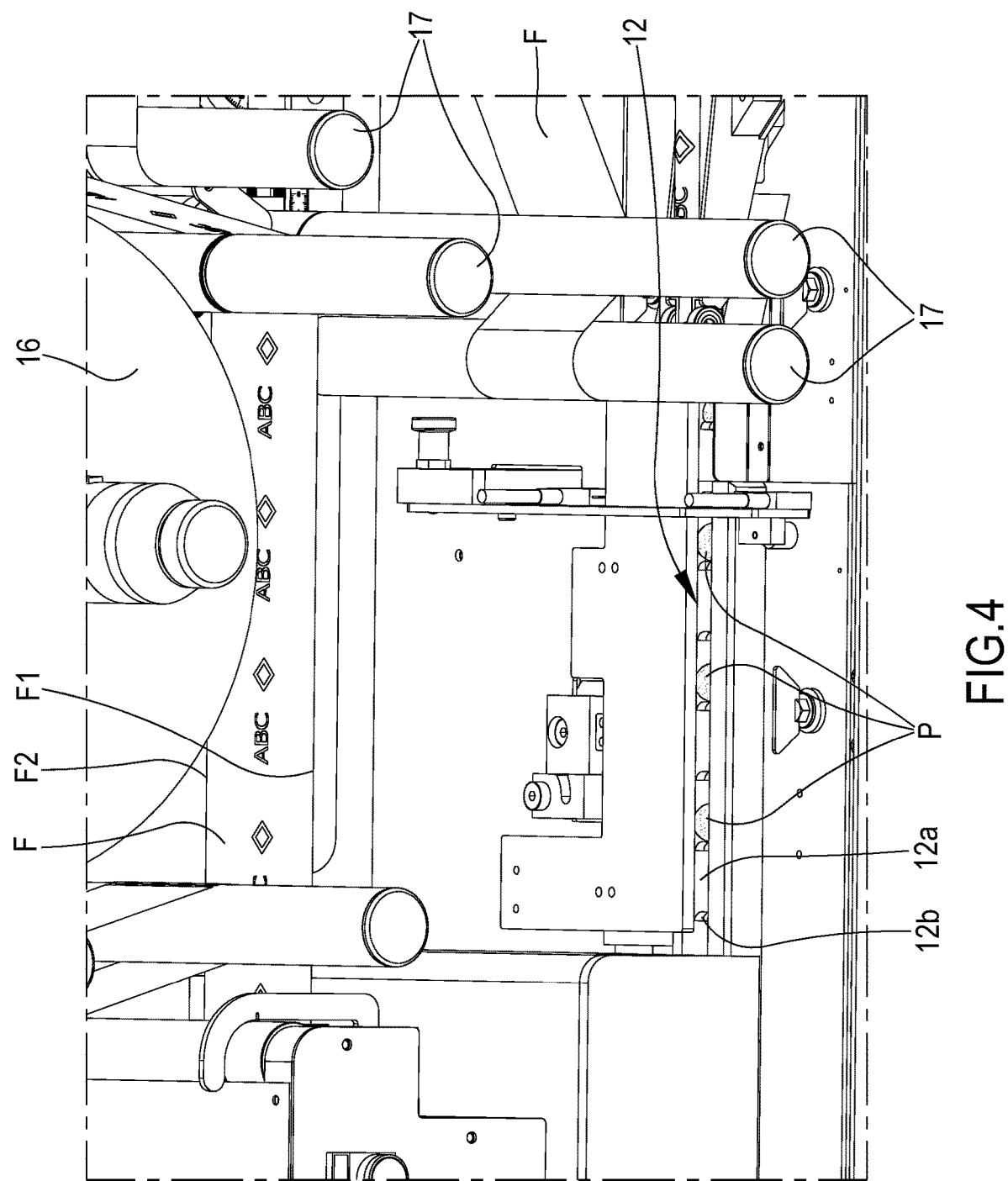
Figure 5:
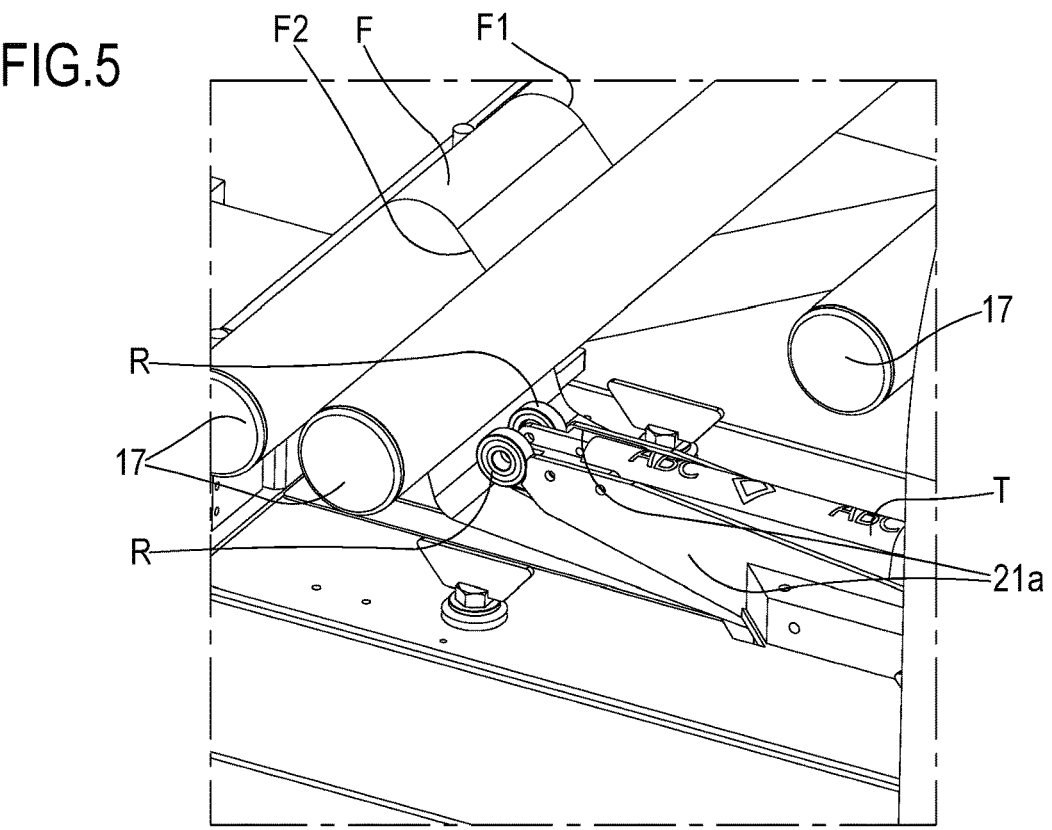
Figure 6:
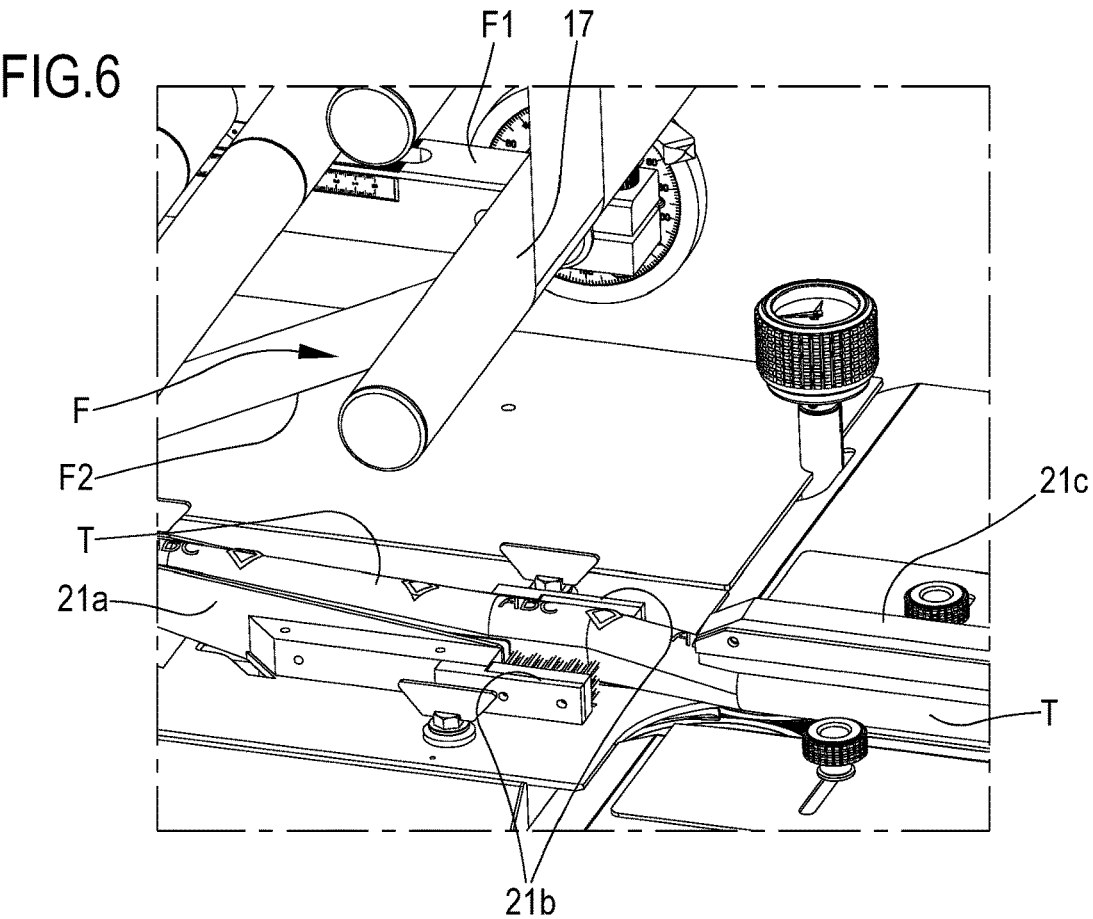
Figure 7:
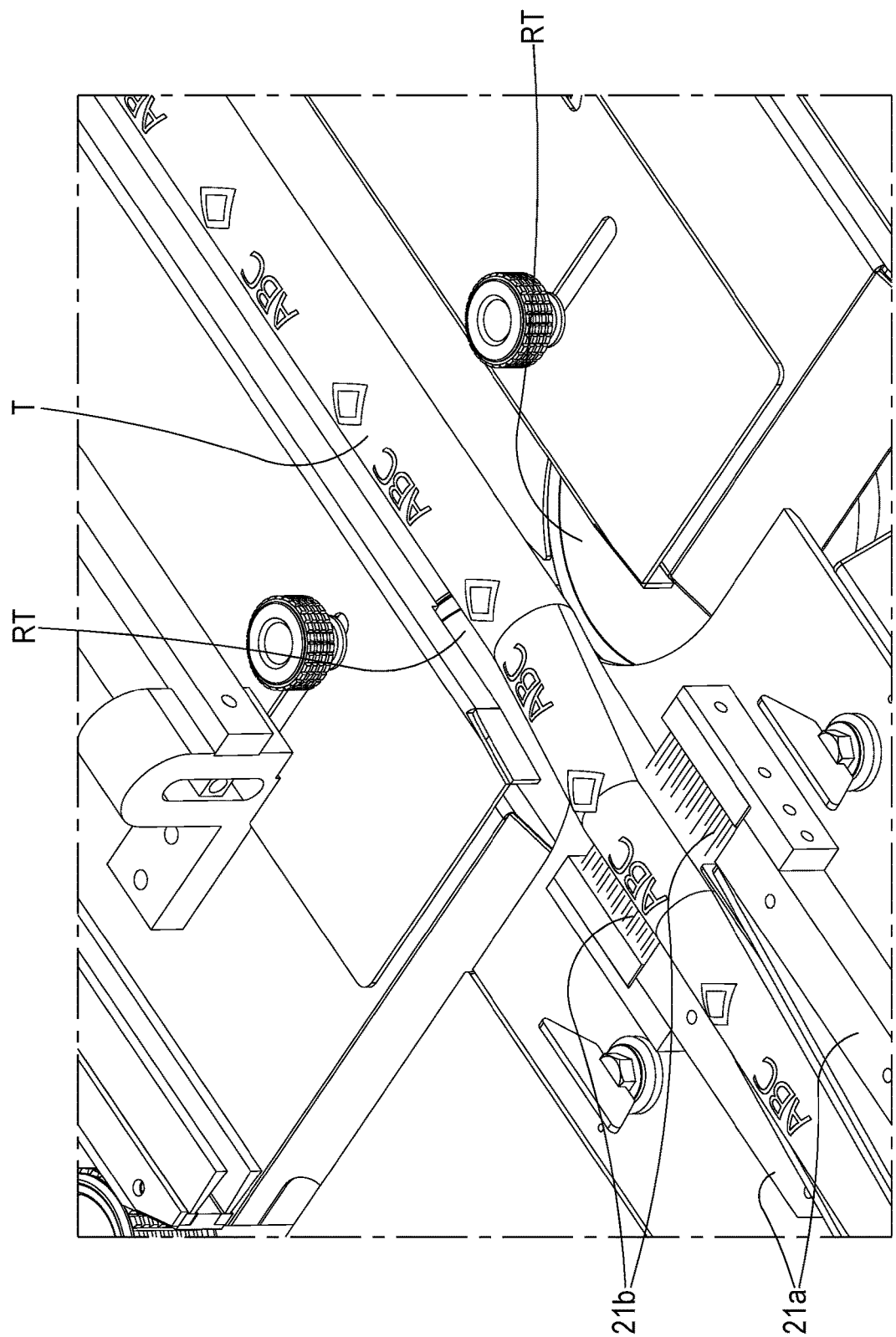
Figure 8:
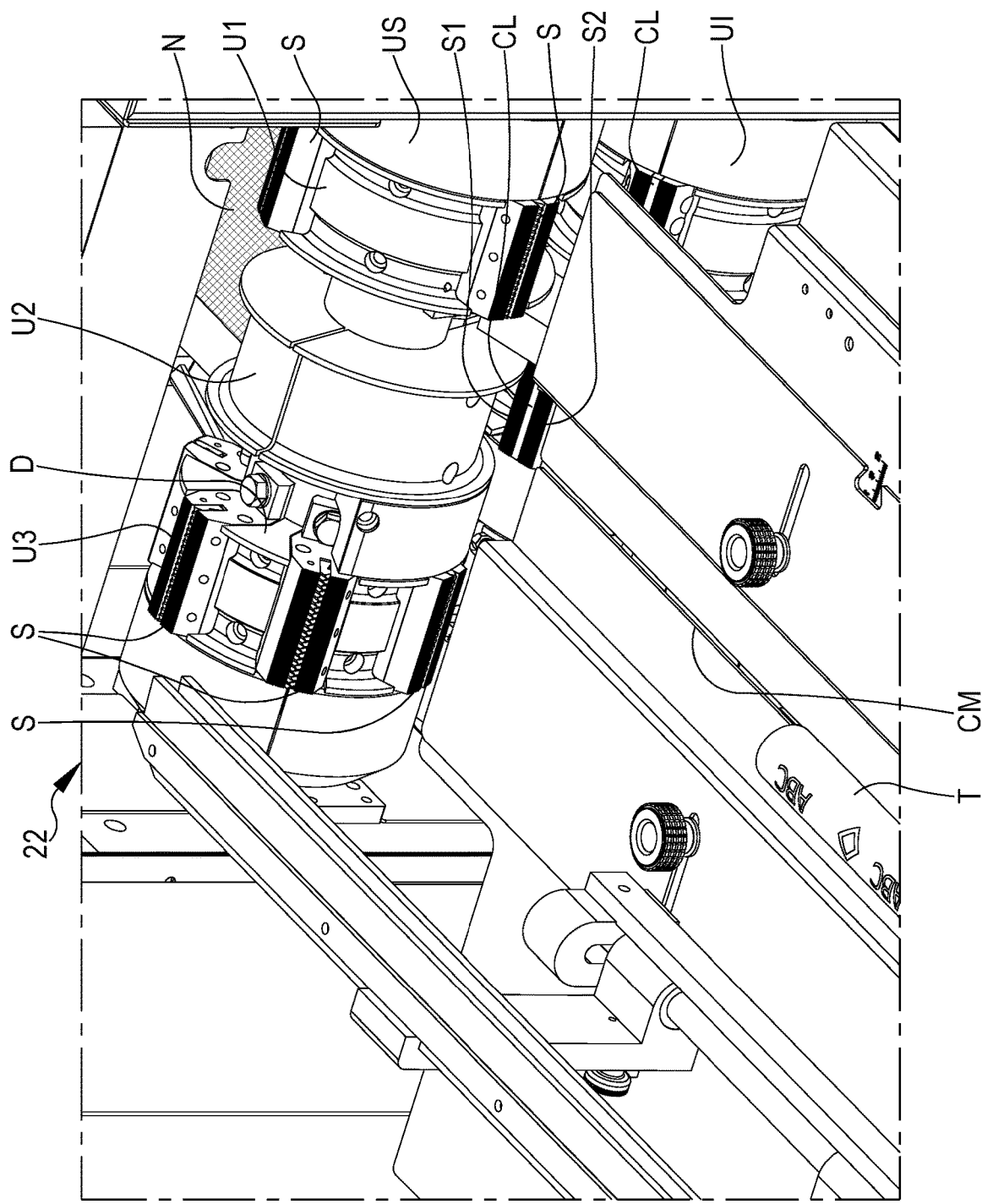

FIG. 2 shows some possible packs, all of which can be made with the machine according to the present invention. In particular, there can be a multiple pack of five pieces indicated by reference C1, a triple pack indicated by reference C2, a double pack indicated by reference C3, and a single package indicated by reference C4. Of course, it is also possible to provide other sizes with a different number of products inside and with different pack lengths.

The cut-sew group 22 is preceded by a tunnel forming unit 21, in which the packaging film F is arranged to create a tube T to receive the product P to be packaged within it. Then, the lower portion of the tube T is closed by welding the two free ends F1 and F2 of the packaging film F, which are folded to envelope and surround product P or the products to be packaged.

In the figures it is possible to see the forming group of the tunnel 21, in which the packaging film F arrives spread and folded by means of the forming bars 21a to form the tube T into which the product or products to be packaged P are subsequently inserted. The forming bars 21a each mount a guide wheel R. At the end of the forming bars 21a there are two side brushes 21b and an upper brush 21c for appropriately shaping the tube T made with the packaging film F.

Once tube T has been created, the lower longitudinal weld is made (relative to the advancement direction of the product or products to be packaged P). Typically, such a longitudinal welding is carried out by means of a series of pairs of heat-sealing wheels RT which heat and form together the lower closure by welding the two free side ends F1 and F2 of the packaging film F (some details are not visible in the drawings).

The tube thus formed, welded in its lower part and filled with the product to be packaged, is then fed to the cut-sew group 22, which allows obtaining the packs by making the transversal welds and the cut to separate two packs from each other. In other words, every machine M is created with a cut-sew group 22 which mounts a set of tools. In the case illustrated in the figures, the set comprises three tools U1, U2 and U3 mounted spaced on their respective rotating shafts.

As a function of the various products to be packed, the cut-sew group 22 has a different conformation. The packs which can be obtained are of different types and can be long or short, wide or narrow according to the product P that they must contain. The cut-sew group 22 can be used to make the two lateral welds of the size of the required package length. The packaging film F is welded into a tube wrapper about the product to be packaged, and the cut-sew group 22 is used to separate the mutually different packs. In particular, the rotating cut-sew group 22 defines how long the tube is to be cut and creates welds and cuts at a defined distance. Each cut defines the tail of the package just finished and the head of the new package being made. In particular, the cut is made in the center of the weld, which is performed by a tool of the cut-sew group 22.

Figure 9:
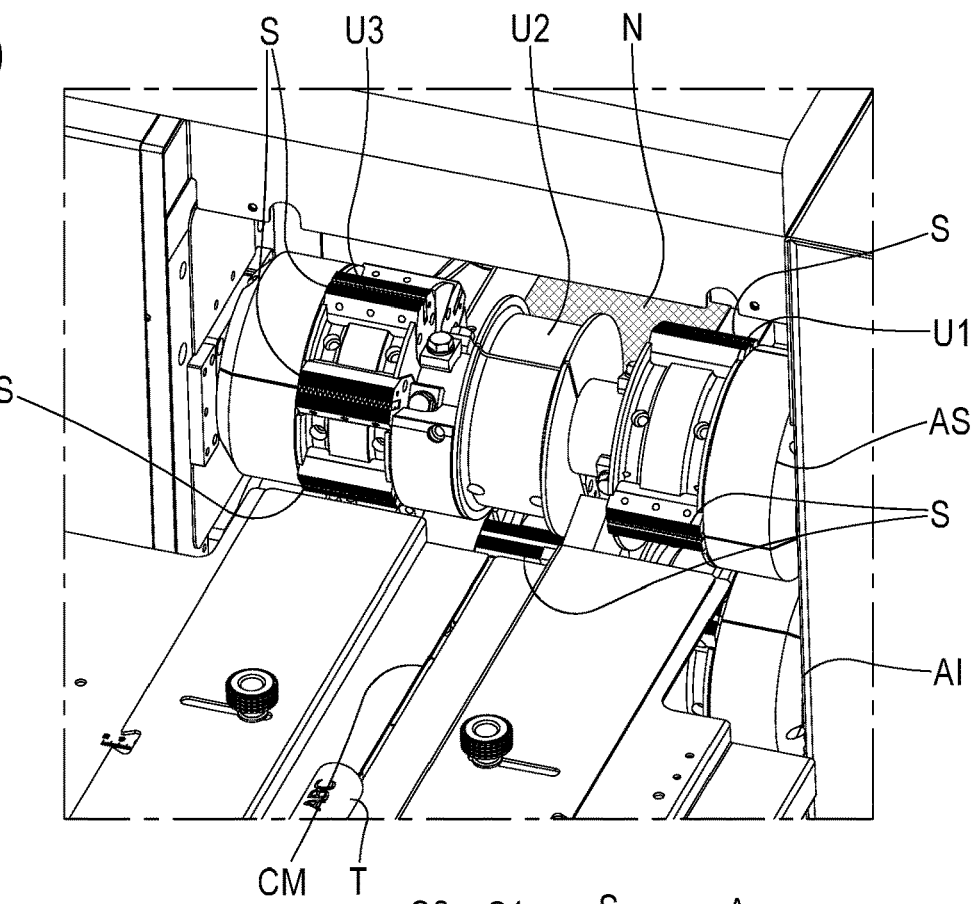
FIGS. 9-11 show construction details of the cut-sew group according to the present invention.

FIG. 9 shows one of the three tools U of the cut-sew group 22 which fits a plurality of spatulas S, in particular the upper tool US is shown. A corresponding lower tool UI is fitted at the lower shaft (not fully visible). This figure shows the tool U3 to make single packs which mount six spatulas for each of the upper tool US and lower tool UI.

FIG. 9 shows two spatulas S spaced 60 degrees apart. Each spatula S consists of a first welding element S1 and a second welding element S2. The two welding elements S1 and S2 are parallel welding bars, facing each other and spaced so as to form an opening between them within which the cutting element or blade L is positioned. Typically, the welding bars S1 and S2 have a knurling or grooving SZ on the welding surface which makes the classic crimped impressions on the welds of the packaging film F. The welding bars S1 and S2 of the spatulas S are heated by resistors powered by the current supplied by the collectors.

Figure 10:
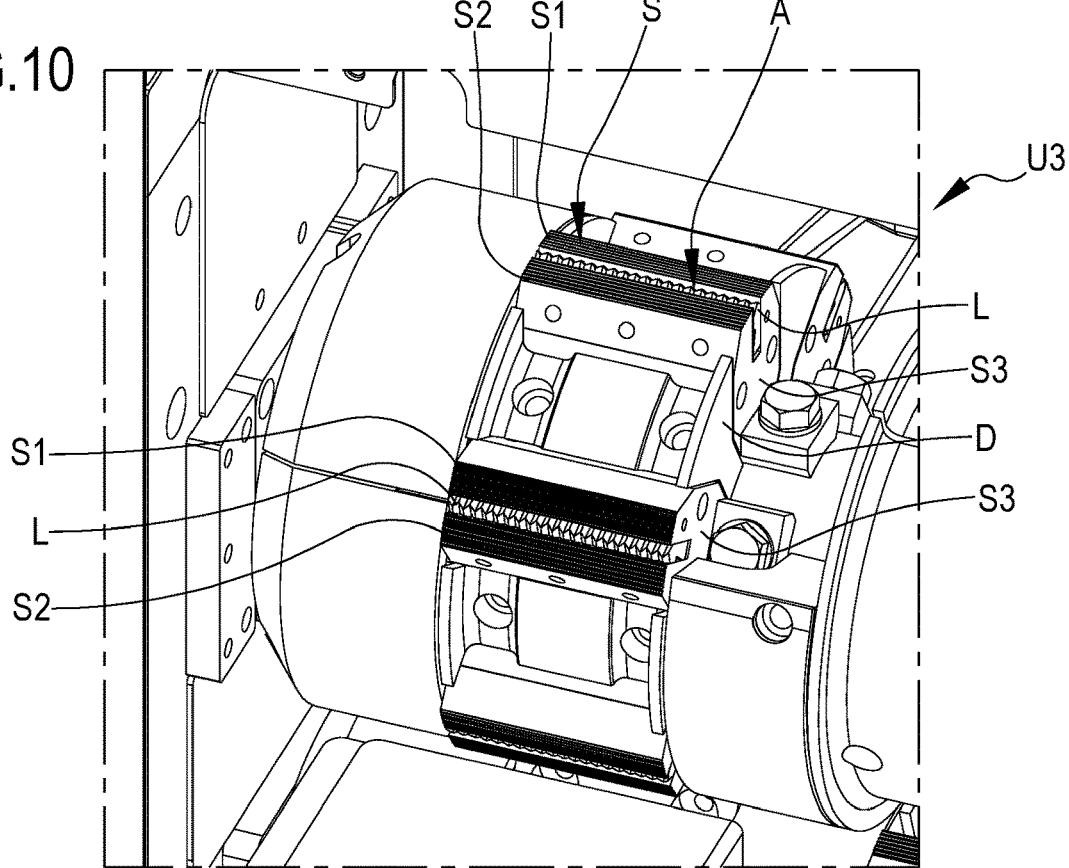

FIG. 9 shows a cutting element L in the form of a serrated blade (or zigzag blade) which makes it possible to make the classic zigzag-shaped cuts for heat-welded flowpack packaging. At the corresponding lower tool UI, the cutting element is a straight counterblade CL, e.g. as shown in FIG. 10. The counterblade CL is fitted on cup springs to cushion the blow of the blade L during cutting. The cutting elements L and CL are actuated during or at the end of welding and are controlled by actuators. In particular, the blade L mounted on the upper shaft AS is driven, i.e. it is lowered to approach the counterblade CL fitted on the lower shaft AI and thus make the cut.

The cutting elements L (blade) and CL (counterblade) are preferably made of hard steel.

In particular, the zigzag-shaped cuts can be seen in FIG. 2 on the side edges of the illustrated packs. A straight cut can also be provided in which both the upper and lower cutting elements are straight and make a scissor-type cut.

In the embodiment shown in the figures, the three tools U1, U2, and U3 fit three spatulas S, a single spatula S, and six spatulas S, respectively. Therefore, tool U1 fit one spatula every 120 degrees, tool U2 fits a single spatula, and tool U3 fits six spatulas spaced 60 degrees apart.

In this case, medium packs (two to five products in the same pack) are preferably made with the U1 tool, long packs (seven to ten products in the same pack) are made with the U2 tool, and small packs (single or double) are made with the U3 tool.

On the machine M, there is a centering portion called the machine center CM, i.e. a colored band N indicating the central portion of the machine M. The selection of the tool to be used is made by aligning the tool U1, U2, or U3 with the machine center CM, that is, by translating transversely the cut-sew group 22 to align one of the three tools with the machine center CM. The machine center position CM is aligned with the feed portion 10 and more in detail with the conveyor belt 12 which feeds the product P.

Once the tool to be used, such as U2, is selected, the upper shaft AS and lower shaft AI are aligned with the Homing operation to match the upper and lower spatulas. Of course, this operation must be repeated whenever the tool is changed.

Then a fitting tuning operation is performed between the position of the upper shaft AS and the position of the lower shaft AI. In particular, in the case of tool U3, the lower shaft AI is brought to the home position, then the upper shaft AS is brought to the 30-degree alignment position and is stopped. Subsequently, the lower shaft AI is also moved to the 30-degree alignment position to align the spatulas S of the upper tool US and the lower tool UI.

In the case of the central tool U2, the Homing operation brings both shafts to zero and there is a synchronous 360-degree rotation of the two shafts.

Figure 11:
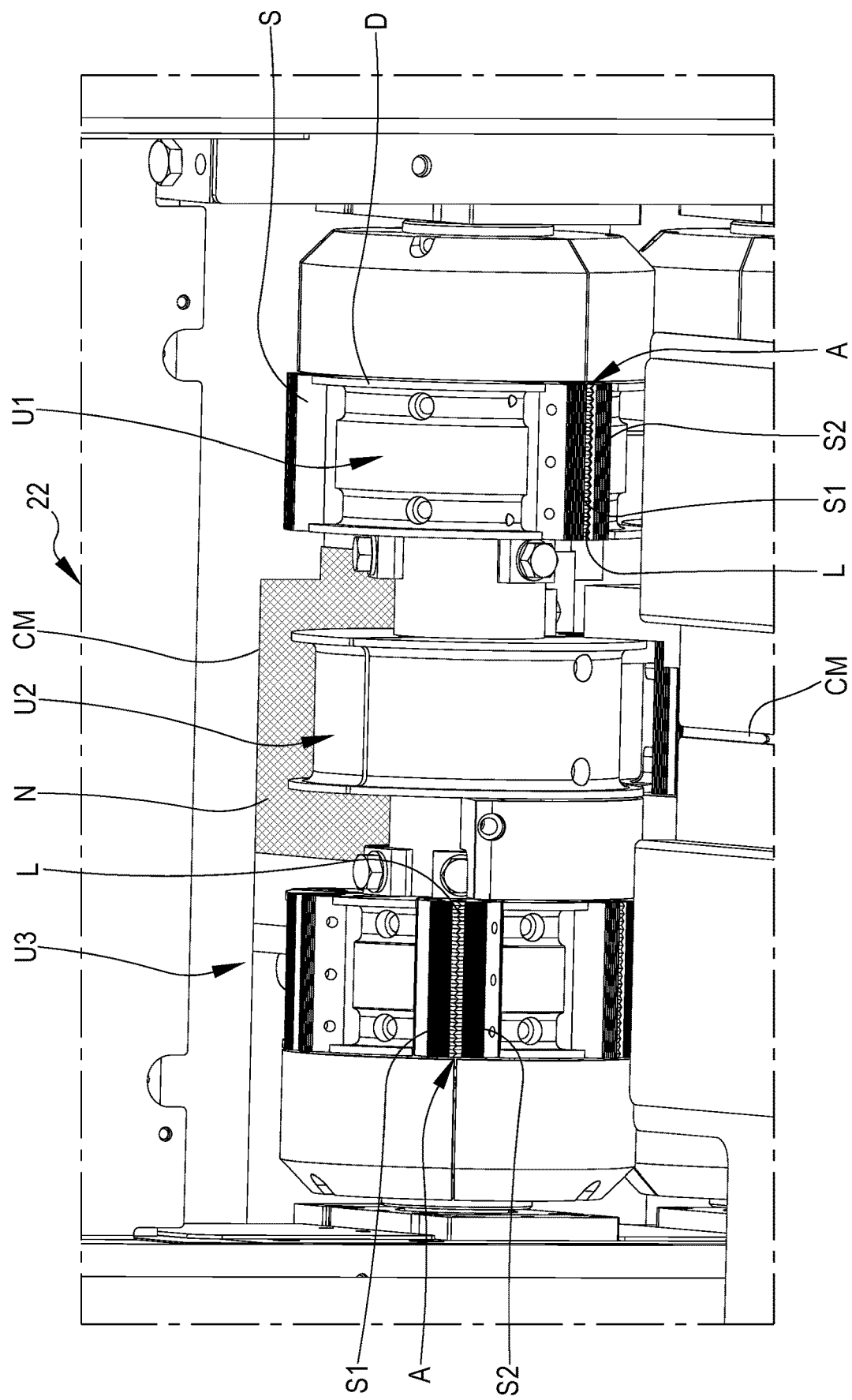
Figure 12:
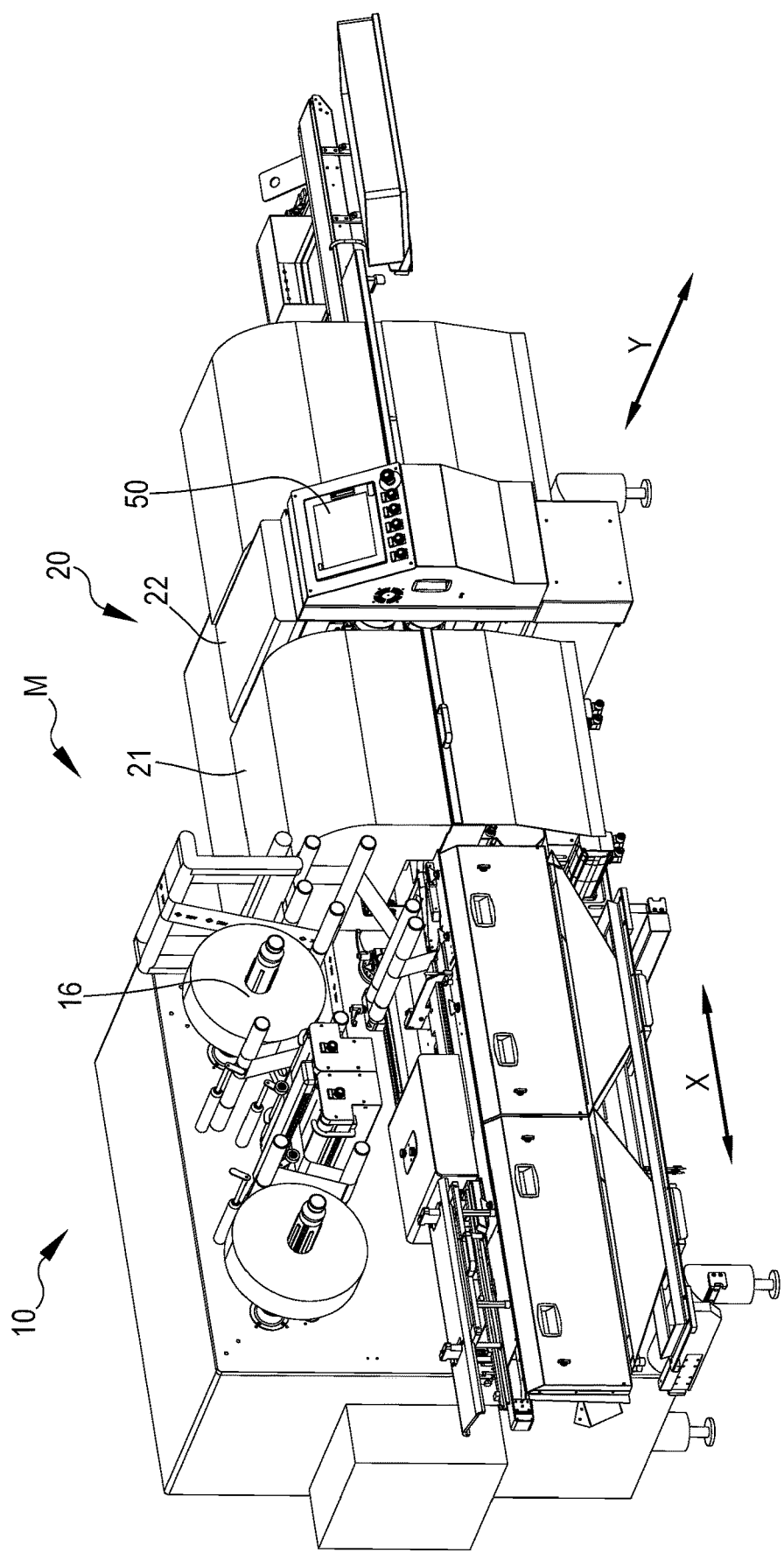
FIG. 12 shows a perspective diagrammatic view of a horizontal machine according to the present invention.
Figure 13:
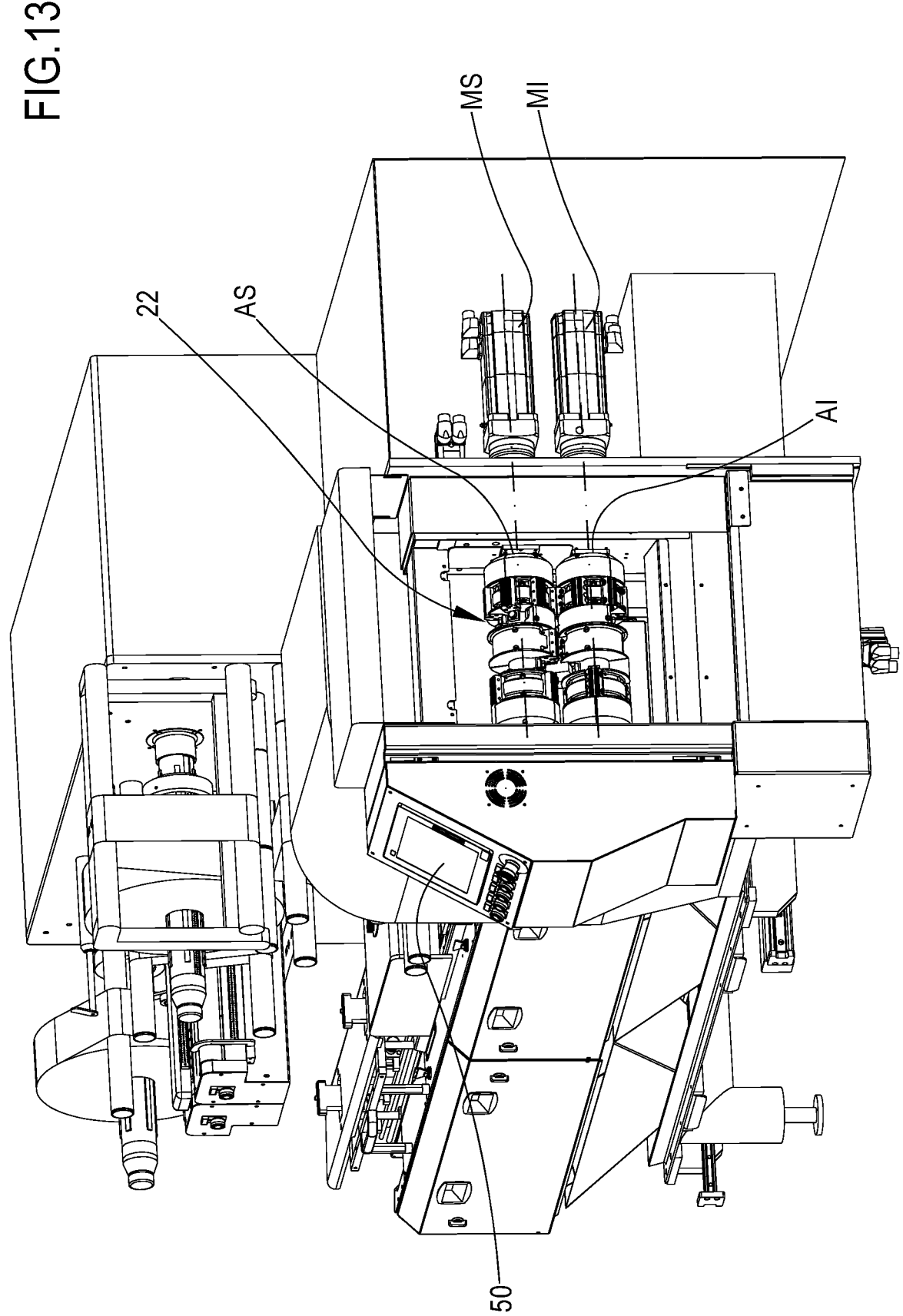
FIG. 13 shows a side and partially cross-section view of the horizontal packaging machine of FIG. 12, in which the cut-sew group according to the present invention is visible.

FIG. 11 illustrates a side section of the cut-sew group 22 showing the tools of the cut-sew group 22 and in particular the U3 tool for making single packs which mounts six spatulas S, as mentioned above. The spatulas S are mounted cantilevered from the upper shaft AS and the lower shaft AI. As best seen in FIG. 11, the two welding elements S1 and S2 are parallel, facing, and spaced solder bars connected by a central portion S3. The central portion S3 of each spatula S is connected to the shaft AS or AI e.g. by bolted flanges or brackets which are made integral with the shaft on which they are mounted. Spacer elements D can be fitted between the different spatulas S of each tool U.

Figure 14:
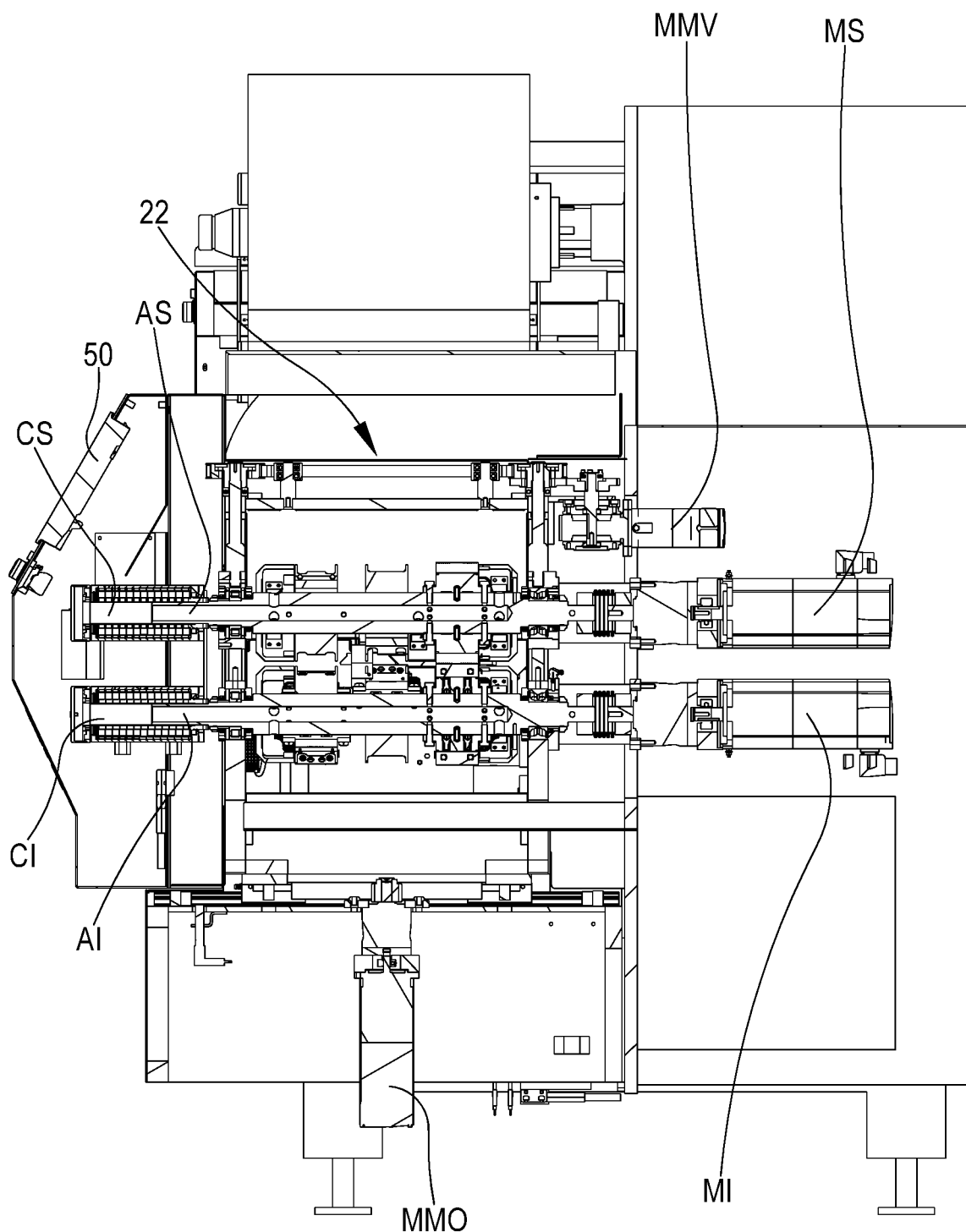
FIGS. 14 and 15 show cross-section views of the horizontal packaging machine of FIG. 12, in which the cut-sew group according to the present invention is visible.
Figure 15:
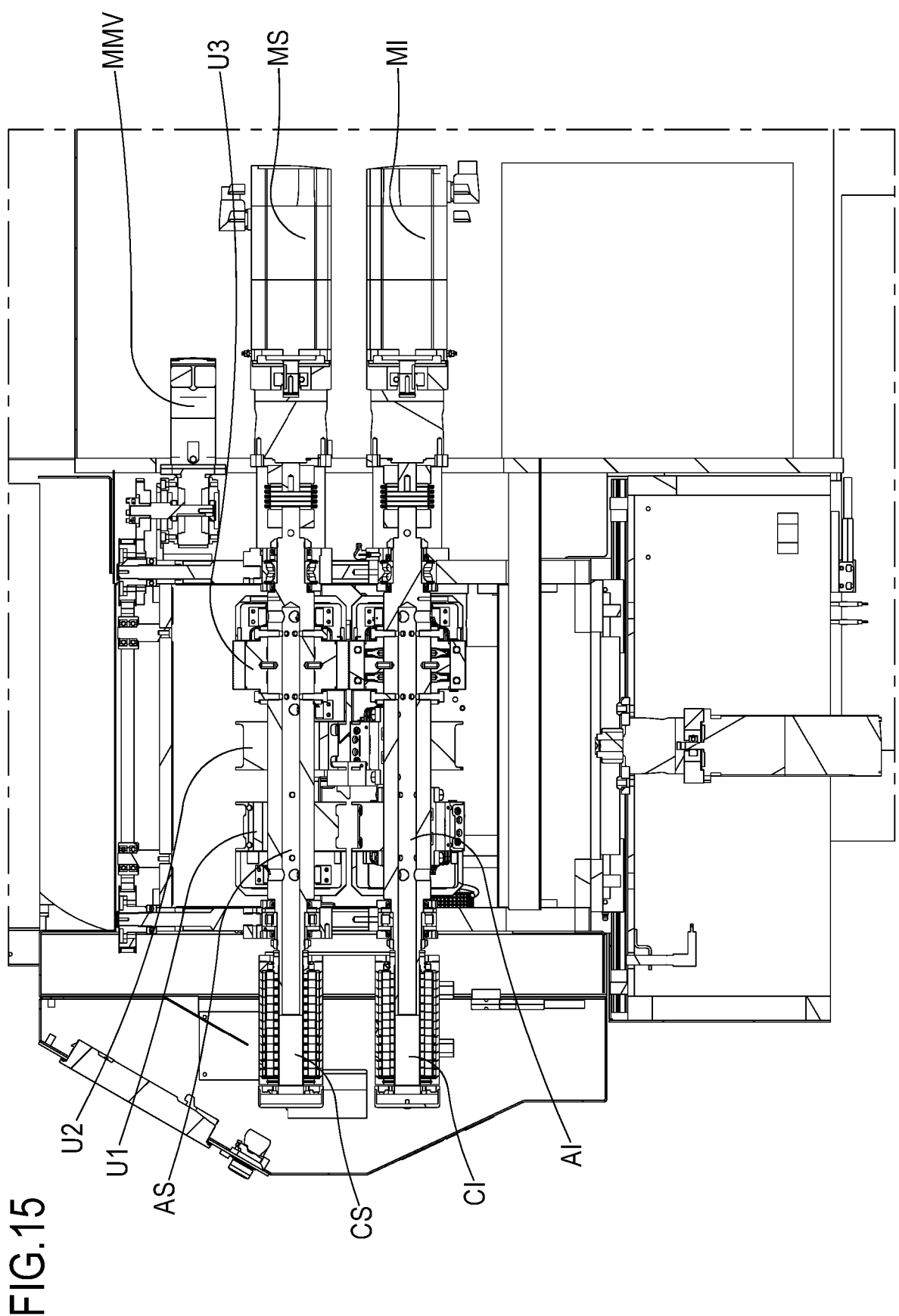
Figure 16:
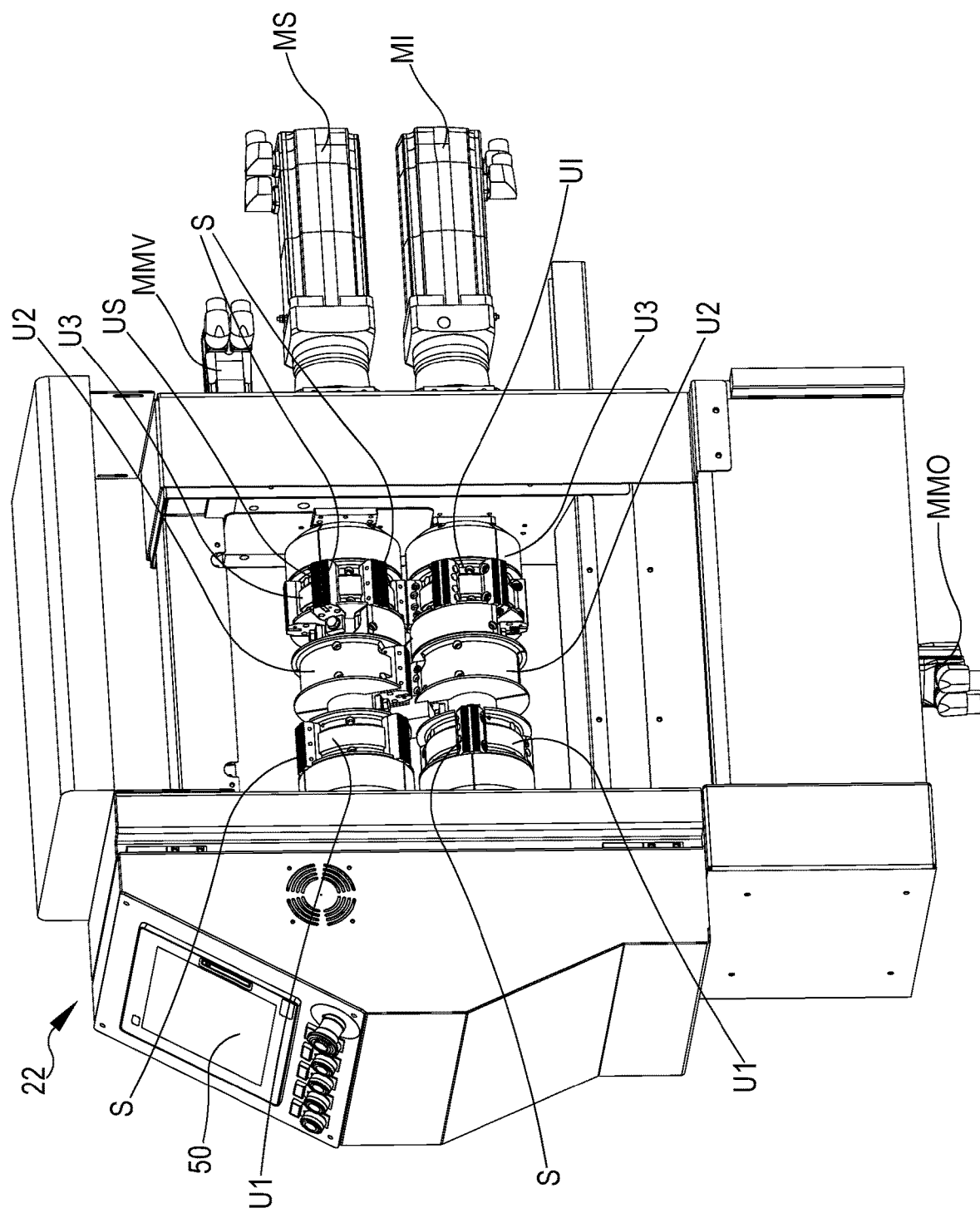
FIG. 16 shows a view of the support structure of a cut-sew group according to the present invention.
Figure 17:
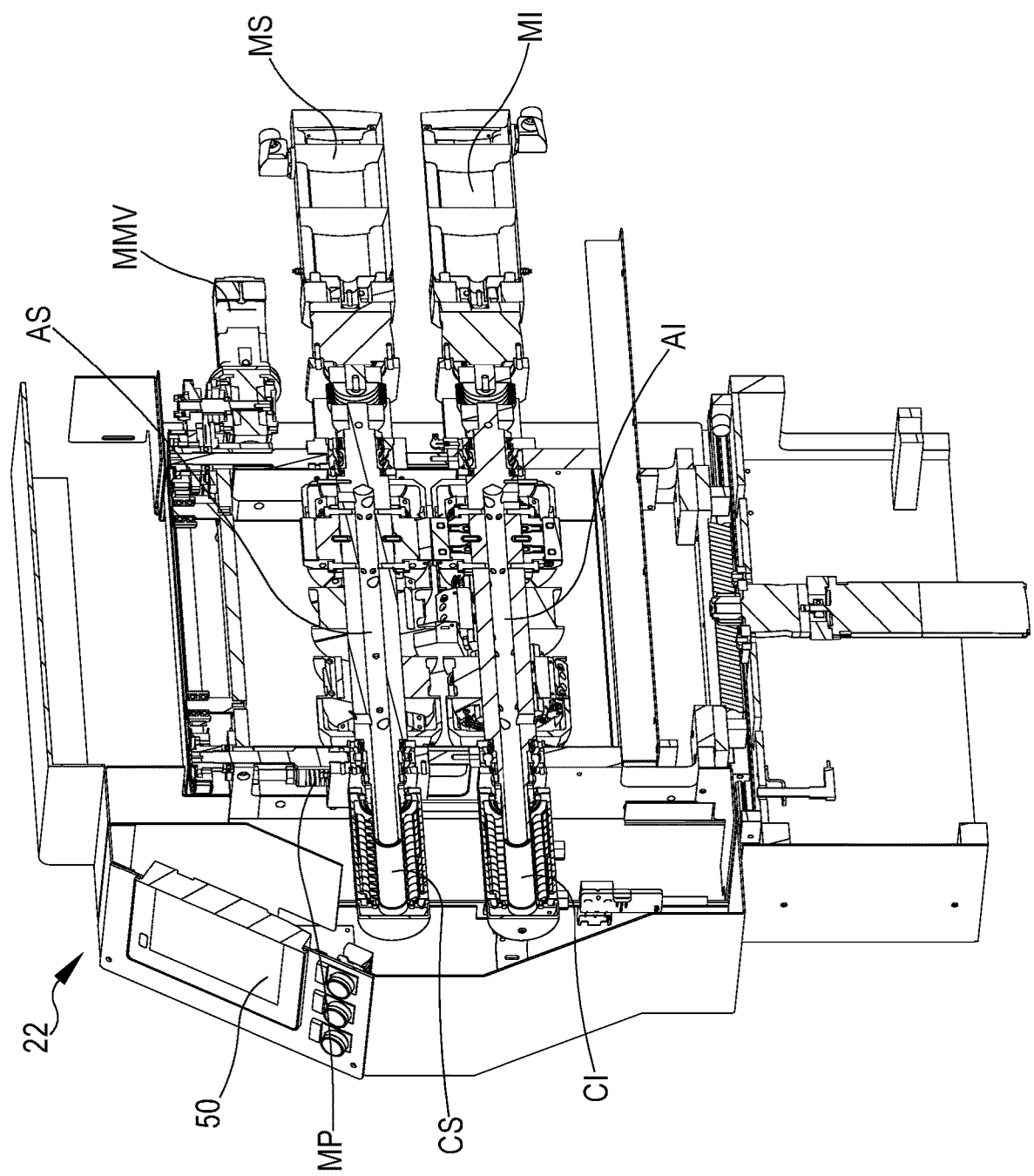
FIG. 17 shows a cross-section view of the support structure of the cut-sew group in FIG. 16.
Figure 18:
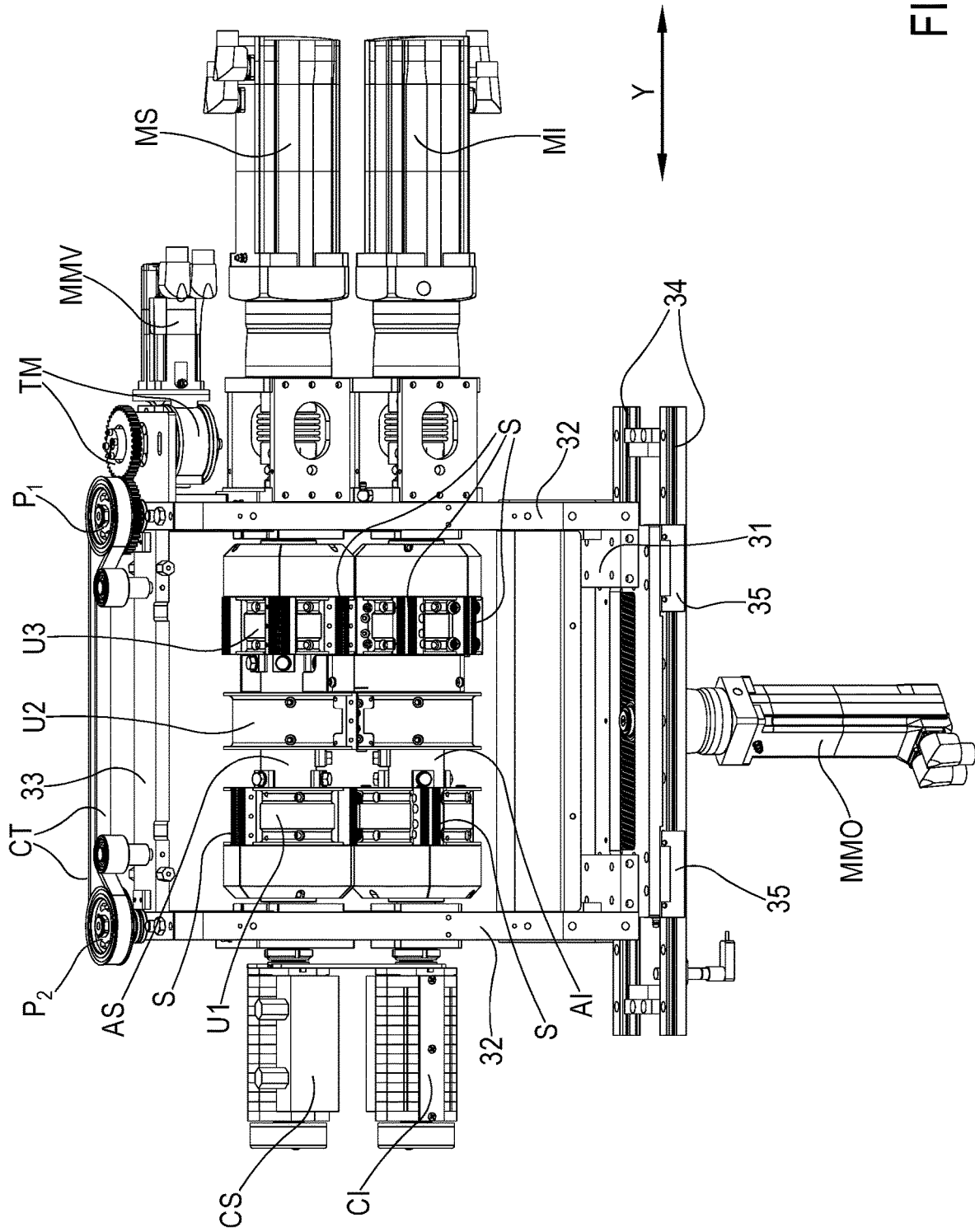
FIGS. 18 and 19 show perspective views of the support structure of cut-sew group in FIG. 16.
Figure 19:
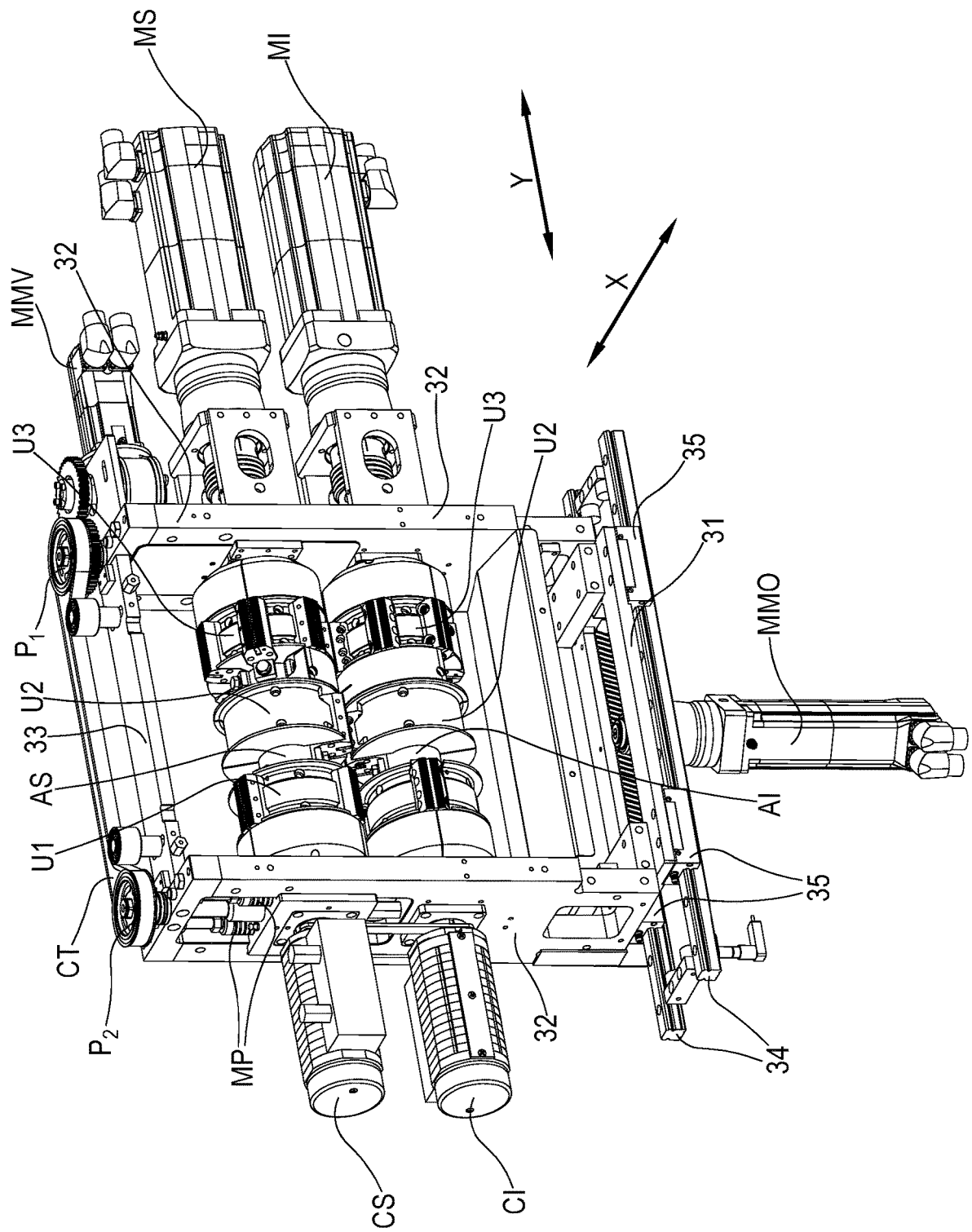
Figure 20:
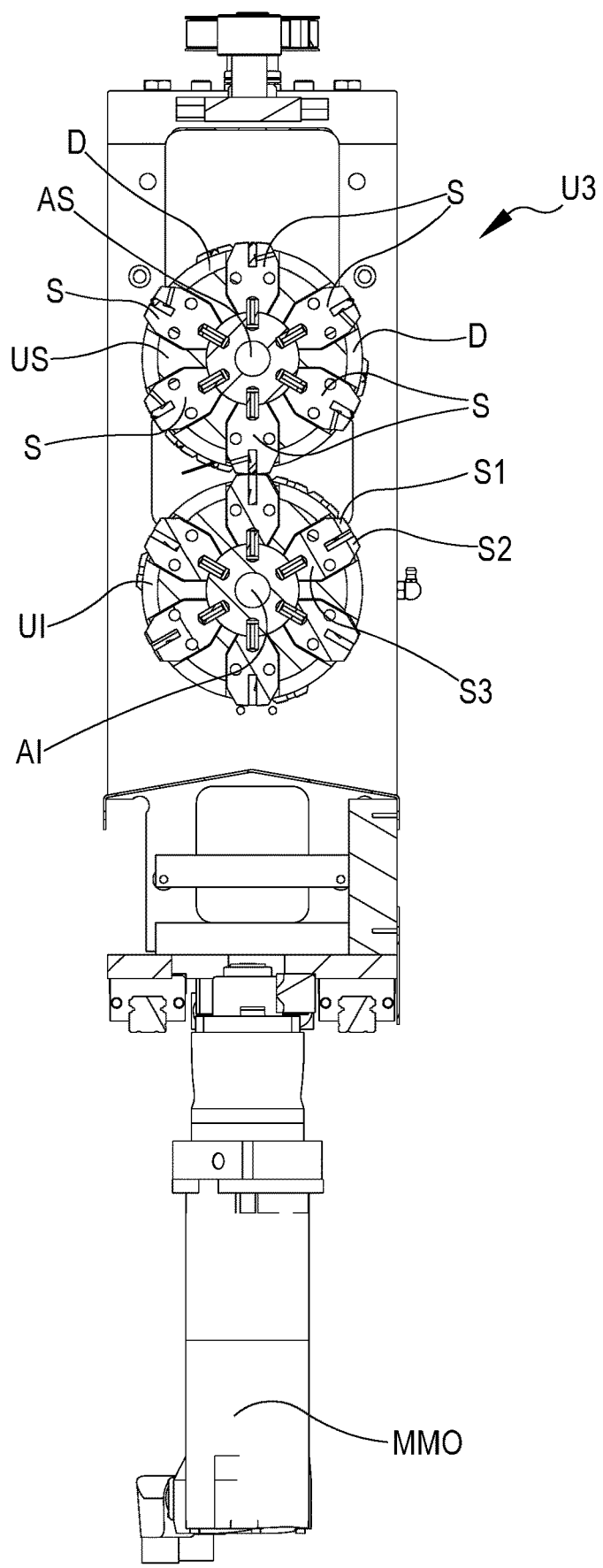
FIGS. 20-22 show side cross-section views of the three tools of the cut-sew group according to the present invention which illustrate configurations of the heat-sealing spatulas for each tool.
Figure 22:
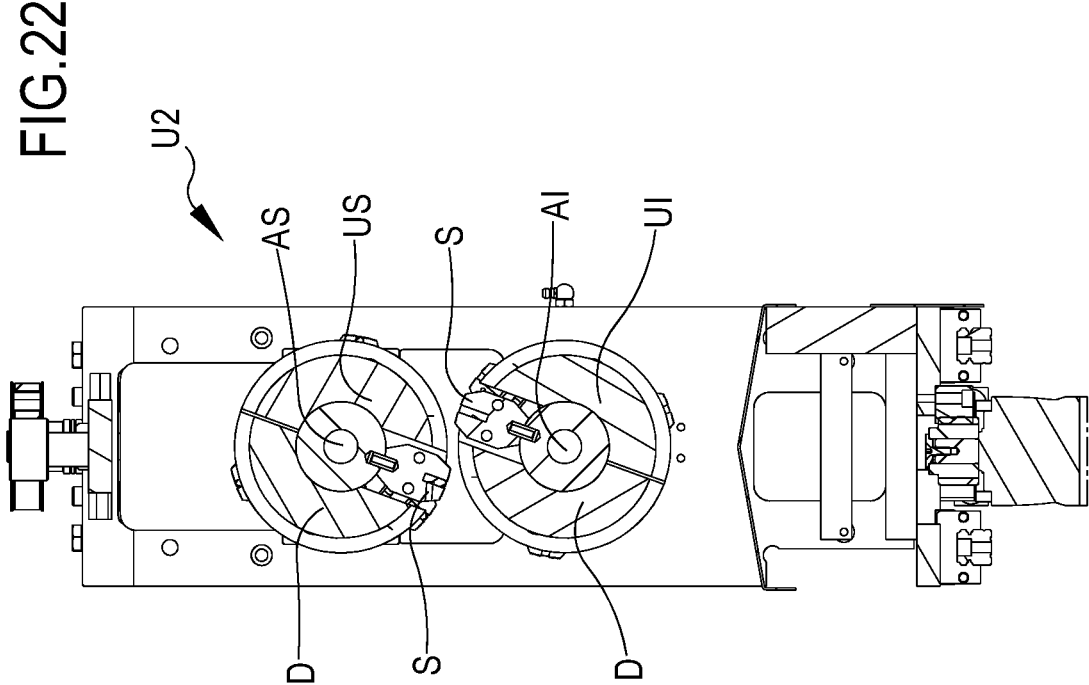
Figure 21:
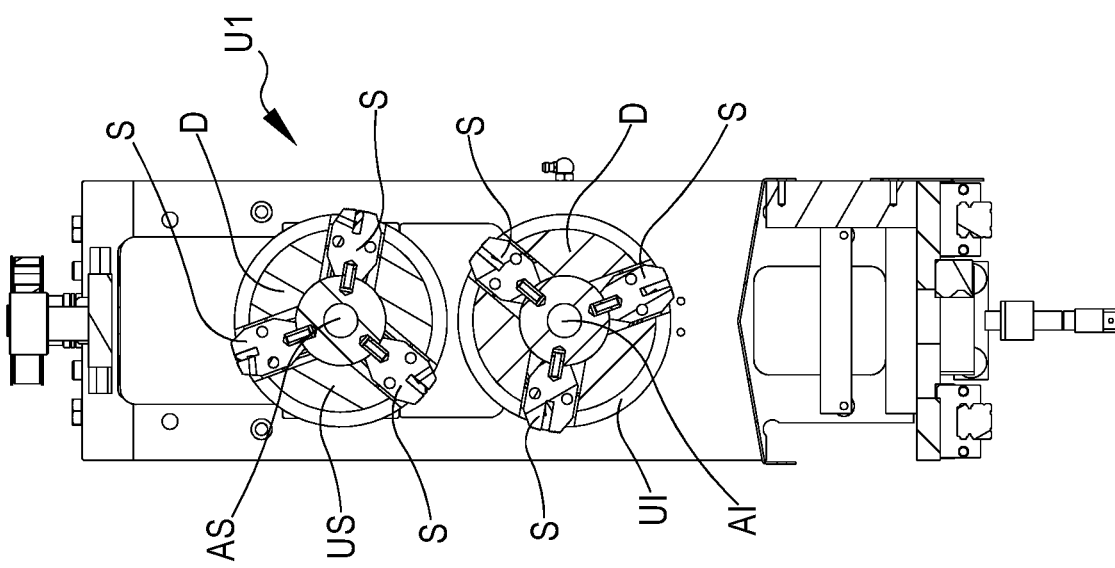

FIG. 14 shows the structure of the cut-sew group 22. In particular, the two upper rotating shafts AS and the lower rotating shafts AI are fitted on a carriage or slide 30 which allows a movement in the direction Y indicated by the arrow.

The carriage 30 comprises a support base 31 fitted on two guide rails 34, two uprights 32, and an upper closure portion 33.

The two guide rails 34 extend transversely relative to the product advancement direction X. The support base 31 fits recirculating ball bearing slides 35 (two slides for each rail rod 34) and there is a movement gear driven by a horizontal movement motor MMO.

The upper shaft AS is driven in rotation by an upper motor MS and the lower shaft AI is driven in rotation by a lower motor MI. The shafts AS and AI are directly engaged on the rotational axes of the respective motor.

The accuracy of the contact between a spatula S of the upper tool US and a spatula of the lower tool UI is ensured by the motors which move the upper AS and lower AI rotary shafts.

The electrified collectors CS and CI are mounted on the side opposite to the motors MS and MI.

There is a drive belt CT in the upper portion of the carriage 30 which turns two pins to achieve height adjustment of the upper shaft AS relative to the lower shaft AI. This is a micrometer adjustment which is used to adjust the welding and cutting pressure. It is used to make the spatulas S of the upper and lower tools touch.

Therefore, means are present for compensating the mutual distance between the two shafts AS and AI with micrometric adjustment to compensate for thermal expansion and to be able to use packaging films of different thicknesses.

In the upper part of the carriage 30, there is a small electric motor MMV that by means of a mechanical transmission TM turns a first pulley P1, which through the belt CT turns a second driven pulley P2 and by virtue of a worm screw moves the upper shaft AS, which carries the upper cut-sew tools US, either up or down. The upper shaft AS can be moved micrometrically either up or down, as needed. The upper shaft AS moves parallel relative to the lower shaft AI (so that the two rotation axes remain mutually parallel). The drive TM is adjusted using maneuvering screws VM (to be added to drawings).

The upper shaft AS is held in place by springs MP on which a preload of about 300 kg/400 kg weighs. This generates an automatic pressure system to hold the upper shaft AS in place. The preload springs MP are used to make the upper shaft AS elastic if something should get stuck between the upper and lower tools.

The pitch between two subsequent cut and sew tools is 100 mm and the maximum stroke in the case of three cut and sew tools is 200 mm. Therefore, as a function of these dimensions, it is possible to increase the footprint of the new cut-sew group 22 inside the machine itself.

In particular, the width of the machine remains the same and slightly increases the projection of the cut-sew group from the operator side.

For positioning the correct tool to be used, a motor MMO is present which moves the entire cut-sew group 100 mm to the left or right of its initial position. Therefore, it is possible to choose between three different tools with just one displacement of 100 mm in either direction.

Thus, the cut-sew group 22 comprises at least four motors: one for each of the shafts MS and MI, one for the vertical displacement MMV of the upper shaft AS, and one for the horizontal translation MMO of the cut-sew group 22.

In the final machine, there is a safety guard which closes off the entire area of the welding unit 20.

To maintain the same overall dimensions compared to the known machines in the new machine, the electrical collectors CS and CI are moved to the side opposite to the one on which the motors MS and MI are mounted.

The electrical collectors CS and CI are longer because they must have diversified control for different tools. The portion of the machine of the present invention which houses the electrical collectors CS and CI is called the safety casing.

The electrical collectors CS and CI are connected to an electrical control panel 50 using appropriate wiring.

In the new machine, the connection cables follow a different path from the known machines and therefore the entire cut-sew group 22 has been modified.

The packaging film F advances and the shafts of the cut-sew group 22 rotate at a speed of 288,333 revolutions per minute (corresponding to 1,250 packs per minute, with a number of spatulas equal to 6).

Of course, when the size to be produced changes, so does the speed of rotation of the shafts of the cut-sew group 22.

The rotation speed of the shafts of the cut-sew group 22 varies according to the number of spatulas mounted on the tools in use and the number of packs per minute to be obtained.

The two shafts AS and AI of the cut-sew group 22 rotate synchronously one clockwise and one counterclockwise.

Once formed, the packs arrive on a conveyor belt which sends them to a packaging machine or are collected in boxes.

By virtue of the aforesaid description, it is thus apparent that the horizontal packaging machine and cut-sew group of the present invention, achieves the purposes and reaches the advantages mentioned above.

Therefore, the machine according to the present invention provides an automatic tool change of the cut-sew group with a solution which does not require downtime, machines stops, and a skilled operator. Furthermore, the solution suggested here does not particularly modify the total machine footprint, guaranteeing the machine a high degree of flexibility to obtain packs of different sizes with a single machine.

Of course, notwithstanding the principle of the invention, the details of construction and embodiments may vary widely relative to that described and illustrated purely by way of example, without because of this departing from the scope of the present invention.

Where the constructive features and techniques mentioned in any successive claims are followed by references signs or numerals, such reference signs were introduced for the sole purpose of increasing intelligibility of the claims themselves and consequently, such reference signs have no limiting effect on the interpretation of each element identified by way of example only by such reference signs.

The invention claimed is:

1. A horizontal packaging machine for packaging a product fed in a horizontal direction comprising a control panel and a cut-sew group suitable to make on a packaging film transverse welds and a cut to close and separate each other two successive packs, wherein said cut-sew group comprises:
    a plurality of cut and sew tools suitable to make said transverse welds and said cut, wherein said transverse welds define edges of the packs according to different packaging sizes for said product;
    adjustment means for changing a size said packs, activated by selecting through said control panel one of said cut and sew tools, and by positioning said cut-sew group so that said product to be packaged is fed at said cut and sew tool selected to make said packs according to a prefixed and set size through said control panel,
    wherein said cut-sew group comprises an upper shaft and a lower shaft independently controlled in rotation by means of a respective upper motor and a respective lower motor,
    wherein each shaft mounts said plurality of cut and sew tools thereon, and
    wherein each cut and sew tool is composed of an upper tool and a corresponding lower tool.

2. The horizontal packaging machine according to claim 1, wherein each cut and sew tool comprises one or more heat-sealing spatulas to make said transverse welds for the closure of the packs and one or more cutting elements to make said cut which separates each other two successive packs.

3. The horizontal packaging machine according to claim 2, wherein each spatula of a cut and sew tool is cantilever mounted on the respective upper or lower shaft, and comprises two welding elements connected each other by a central portion, wherein said central portion is connected to one of said shafts and is made integral with the upper shaft or with the lower shaft.

4. The horizontal packaging machine according to claim 3, wherein the two welding elements of each spatula are parallel, facing and spaced apart each other welding bars, connected each other by said central portion, wherein said two welding elements are shaped so as to form between them an opening within which the cutting element is positioned.

5. The horizontal packaging machine according to claim 4, wherein said spatulas are connected to the respective upper or lower shaft through bolted flanges or brackets.

6. The horizontal packaging machine according to claim 4, wherein each cut and sew tool, in addition to the spatulas and the cutting elements, mounts spacer elements to keep the spatulas in position.

7. The horizontal packaging machine according to claim 4, wherein the cutting element of the upper tool is a serrated blade which allows to make zigzag-shaped cuts, wherein said blade is received between said parallel, facing spaced apart welding bars, and the cutting element of the corresponding lower tool is a straight counterblade mounted on cup springs to cushion the blow of the blade during cutting.

8. The horizontal packaging machine according to claim 2, wherein said cutting elements are made of hard steel.

9. The horizontal packaging machine according to claim 1, wherein said plurality of cut and sew tools of said cut-sew group comprises a first tool, a second tool, and a third tool mounted spaced apart on the respective upper and lower shafts, wherein the first tool mounts three spatulas two by two spaced each other of 120 degrees, the second tool mounts a single spatula and the third tool mounts six spatulas two by two spaced apart each other of 60 degrees.

10. The horizontal packaging machine according to claim 9, wherein a pitch between the first tool and the second tool, and a pitch between the second tool and the third tool, is 100 mm, and wherein the maximum displacement stroke of the cut-sew group for positioning the selected tool is 200 mm.

11. The horizontal packaging machine according to claim 1, wherein said adjustment means comprises a carriage or a slide, and wherein said cut-sew group is mounted on the carriage or the slide which allows a displacement of said cut-sew group in a direction transversal to the horizontal feeding direction of the product in such a way as to select the tool to be used for packaging the product according to the selected size and position of said cut-sew group, so that said product to be packaged is fed at the selected cut and sew tool.

12. The horizontal packaging machine according to claim 11, said adjustment means further comprises a horizontal movement motor, and wherein said carriage comprises a structure having a support base mounted on two guide rails, two uprights and an closure portion, wherein the two guide rails extend transversely with respect to the product feed direction and the support base mounts recirculating ball runners and said structure is moved through a movement gear driven by the horizontal movement motor.

13. The horizontal packing machine according to claim 12, wherein between said two uprights of said carriage the upper shaft and the lower shaft are mounted independently controlled in rotation by means of the respective upper motor and the respective lower motor also mounted on one of said uprights, wherein each shaft mounts said plurality of cut and sew tools thereon.

14. The horizontal packaging machine according to claim 13, wherein on the other upright on the opposite side with respect to that one on which the upper motor and the lower motor are mounted, respectively, an upper electric collector and a lower electric collector for carrying to said upper shaft and said lower rotating shaft an electric signal for differentiated heating of one of the cut and sew tools are mounted.

15. A cut-sew group for making transverse welds on a packaging film and a cut for closing and separating each other two successive packs, wherein said cut-sew group comprises:
    a plurality of cut and sew tools for making said transverse welds and said cut, wherein said transverse welds define edges of the packs according to different packaging sizes for said product,
    wherein said cut-sew group can perform a size change of said packs by selecting one of said cut and sew tools, and by positioning said cut-sew group in such a way that a product to be packaged is fed at said cut and sew tool selected for making said packs according to a prefixed size,
    said cut-sew group further comprising an upper shaft and a lower shaft independently driven in rotation by means of a respective upper motor and a respective lower motor, wherein each shaft mounts said plurality of cut and sew tools thereon and wherein each cut and sew tool is composed of an upper tool and a corresponding lower tool.

16. The cut-sew group according to claim 15, wherein each cut and sew tool comprises one or more heat-welding spatulas suitable to make said transverse welds for closing the packs and one or more cutting elements suitable to make said cut which separates each other two successive packs.

17. The cut-sew group according to claim 16, wherein each spatula of a cut and sew tool is cantilever mounted on the respective upper or lower shaft, and comprises two welding elements connected together by a central portion, wherein said central portion is connected to one of said shaft and is made integral with the upper shaft or with the lower shaft.

18. The cut-sew group according to claim 17, wherein the two welding elements of each spatula are parallel, facing and spaced apart each other welding bars, connected together by said central portion, wherein said two welding elements are shaped so as to form between them an opening within which the cutting element is positioned.

19. The cut-sew group according to claim 18, wherein said spatulas are connected to the respective upper or lower shaft by means of bolted flanges or brackets.

20. The cut-sew group according to claim 19, wherein each cut and sew tool, in addition to the spatulas and the cutting elements, mounts spacer elements to keep the spatulas in position.

21. The cut-sew group according to claim 20, wherein the cutting element of the upper tool is a serrated blade which allows to realize zigzag shaped cuts, wherein said blade is received between said parallel, facing and spaced apart welding bars, and the cutting element of the corresponding lower tool is a straight counterblade mounted on cup springs to cushion the blow of the blade during cutting.

22. The cut-sew group according to claim 21, wherein said cutting elements are made of hard steel.

23. The cut-sew group according to claim 22, wherein said plurality of cut and sew tools comprises a first tool, a second tool, and a third tool mounted spaced apart on the respective upper and lower shafts, wherein the first tool mounts three spatulas two by two spaced apart each other of 120 degrees, the second tool mounts a single spatula and the third tool mounts six spatulas two by two spaced apart each other of 60 degrees.

24. The cut-sew group according to claim 23, wherein a pitch between the first tool and the second tool, and a pitch between the second tool and the third tool, is 100 mm, and wherein and the maximum displacement stroke of the cut-sew group for positioning the tool is 200 mm.

* * * * *